United States Patent
Katta

(10) Patent No.: US 10,859,532 B2
(45) Date of Patent: Dec. 8, 2020

(54) SENSOR DEVICE AND SENSING METHOD

(71) Applicant: KYOCERA CORPORATION, Kyoto (JP)

(72) Inventor: Hiroshi Katta, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 321 days.

(21) Appl. No.: 15/324,242

(22) PCT Filed: Aug. 31, 2015

(86) PCT No.: PCT/JP2015/074809
§ 371 (c)(1),
(2) Date: Jan. 5, 2017

(87) PCT Pub. No.: WO2016/032008
PCT Pub. Date: Mar. 3, 2016

(65) Prior Publication Data
US 2017/0205375 A1 Jul. 20, 2017

(30) Foreign Application Priority Data

Aug. 29, 2014 (JP) .................. 2014-175768
Jun. 30, 2015 (JP) .................. 2015-130676

(51) Int. Cl.
G01N 29/04 (2006.01)
G01N 29/34 (2006.01)
(Continued)

(52) U.S. Cl.
CPC ......... *G01N 29/041* (2013.01); *G01N 29/022* (2013.01); *G01N 29/30* (2013.01); *G01N 29/348* (2013.01)

(58) Field of Classification Search
CPC .... G01N 29/022; G01N 29/041; G01N 29/30; G01N 29/348
(Continued)

(56) References Cited

U.S. PATENT DOCUMENTS 4,156,084 A * 5/1979 Ondetti ................ C07C 327/00
546/263
4,516,084 A * 5/1985 Crowley ................... H03L 7/23
331/12

(Continued)

FOREIGN PATENT DOCUMENTS

EP 3006933 A1 4/2016
JP A 11-83757 3/1999
(Continued)

OTHER PUBLICATIONS

International Search Report in PCT/JP2015/074809 dated Nov. 24, 2015, in 1 page.
(Continued)

Primary Examiner — Alexander Satanovsky
Assistant Examiner — Jeffrey P Aiello
(74) Attorney, Agent, or Firm — Duane Morris LLP

(57) ABSTRACT

A sensor device includes: a first signal generator and a second signal generator which each generate at least one of a signal of a first frequency and a signal of a second frequency; and a calculation part configured to obtain a reference phase difference based on a first reference signal which is obtained by generating the signal of the first frequency from the first signal generator in such a state that the calculation part is connected to the first signal generator, and a second reference signal which is obtained by generating the signal of the second frequency from the second signal generator in such a state that the calculation part is connected to the second signal generator, and calculates a (Continued)

reference voltage corresponding to the reference phase difference based on the first reference signal and the second reference signal in accordance with a heterodyne system.

17 Claims, 15 Drawing Sheets

(51) Int. Cl.
    *G01N 29/30*   (2006.01)
    *G01N 29/02*   (2006.01)
(58) Field of Classification Search
    USPC ............ 324/76.77; 327/105, 156; 331/18;
                          375/219, 329, 376; 702/72
    See application file for complete search history.

(56) References Cited

U.S. PATENT DOCUMENTS

| | | | |
|---|---|---|---|
| 4,700,129 A | 10/1987 | Yoshizawa et al. | |
| 4,831,446 A * | 5/1989 | Nakajima | H04N 5/073 348/512 |
| 4,951,009 A * | 8/1990 | Collins | G01R 33/3628 333/17.3 |
| 5,306,644 A | 4/1994 | Myerholtz et al. | |
| 5,786,733 A * | 7/1998 | Yamaguchi | H03L 7/113 331/11 |
| 6,311,046 B1 * | 10/2001 | Dent | H03F 1/0205 455/102 |
| 2004/0087279 A1 * | 5/2004 | Muschallik | H04B 1/30 455/73 |
| 2007/0021933 A1 * | 1/2007 | Sanduleanu | H03D 13/003 702/72 |
| 2007/0120611 A1 * | 5/2007 | Kim | H03D 13/003 331/25 |
| 2008/0129146 A1 * | 6/2008 | Puskas | B06B 1/0284 310/317 |
| 2009/0086867 A1 * | 4/2009 | Banu | G06F 1/12 375/356 |
| 2009/0224902 A1 * | 9/2009 | Watasue | B60C 23/0416 340/447 |
| 2009/0243628 A1 | 10/2009 | Andarawis | |
| 2010/0148588 A1 * | 6/2010 | Algrain | H02P 5/50 307/84 |
| 2010/0227420 A1 * | 9/2010 | Banna | H01J 37/321 438/10 |
| 2011/0227585 A1 | 9/2011 | Andarawis | |
| 2012/0177383 A1 * | 7/2012 | Tanimura | H04B 10/61 398/158 |
| 2014/0003086 A1 * | 1/2014 | Schaffer | B82Y 30/00 362/603 |
| 2015/0017735 A1 * | 1/2015 | Katta | G01N 33/5308 436/151 |
| 2016/0001333 A1 * | 1/2016 | Jones | B06B 1/0276 134/1 |

FOREIGN PATENT DOCUMENTS

| | | | |
|---|---|---|---|
| JP | H1183757 | * | 3/1999 |
| JP | WO2007/145108 A1 | | 12/2007 |
| JP | A 2009-238226 | | 10/2009 |
| JP | A 2014-38112 | | 2/2014 |
| JP | WO2016/032008 A1 | | 3/2016 |

OTHER PUBLICATIONS

Extended European Search Report dated Feb. 22, 2018 in corresponding European Patent Application No. 15836465.3.

* cited by examiner (a)

(b)

(a)

(b)

(a)

(b)

(a)

(b)

(a)

(b)

(a)

(b)

(a)

(b)

(a)

(b)

(c)

(a)

(b)

(a)

(b)

(a)

(b)

(a)

(b)

(a)

(b)

SENSOR DEVICE AND SENSING METHOD

TECHNICAL FIELD

The present invention relates to a sensor device capable of measuring an analyte, and a sensing method.

BACKGROUND ART

As the sensor device, for example, a sensor device which measures an analyte by using a surface acoustic wave (SAW) element is known.

In the sensor device, a technology of improving measurement accuracy by performing correction or calibration in accordance with various method is disclosed (for example, Patent Literature 1).

CITATION LIST

Patent Literature

Patent Literature 1: Japanese Unexamined Patent Publication JP-A 2009-238226

SUMMARY OF INVENTION

Technical Problem

However, in the technology disclosed in Patent Literature 1, it is difficult to simply obtain a reference phase difference and a reference voltage corresponding thereto with a sensor device itself.

Accordingly, there is a demand for a sensor device capable of simply obtaining a reference phase difference and a reference voltage corresponding thereto with a sensor device itself, and a sensing method.

Solution to Problem

A sensor device according to an embodiment of the invention includes: a first signal generator configured to generate at least one of a signal of a first frequency and a signal of a second frequency; a second signal generator configured to generate at least one of the signal of the first frequency and the signal of the second frequency; and a calculation part connectable to each of the first signal generator and the second signal generator, wherein the calculation part is configured to obtain a reference phase difference based on a first reference signal which is obtained by generating the signal of the first frequency from the first signal generator in such a state that the calculation part is connected to the first signal generator, and based on a second reference signal which is obtained by generating the signal of the second frequency from the second signal generator in such a state that the calculation part is connected to the second signal generator, and is configured to calculate a reference voltage corresponding to the reference phase difference.

In addition, a sensor device according to another embodiment of the invention includes: a signal generator configured to generate a signal of a first frequency and a signal of a second frequency different from the first frequency, and comprising a first output part configured to output at least one of the signal of the first frequency and the signal of the second frequency, and a second output part configured to output at least one of the signal of the first frequency and the signal of the second frequency; and a calculation part connectable to each of the first output part and the second output part, wherein the calculation part is configured to obtain a reference phase difference based on a first reference signal obtained by outputting the signal of the first frequency from the first output part in such a state that the first output part and the calculation part are connected to each other, and a second reference signal obtained by outputting the signal of the second frequency from the second output part in such a state that the second output part and the calculation part are connected to each other, and calculate a reference voltage corresponding to the reference phase difference.

In addition, a sensing method according to still another embodiment of the invention includes: a signal output step of generating and outputting a signal of a first frequency and a signal of a second frequency different from the first frequency by a signal generator; and a calculation step of obtaining a reference phase difference based on a first reference signal obtained from the signal of the first frequency which is outputted from the signal generator, and from a second reference signal obtained from the signal of the second frequency which is outputted from the signal generator simultaneously with the signal of the first frequency, and of calculating a reference voltage corresponding to the reference phase difference from the first reference signal and the second reference signal by a calculation part.

Advantageous Effects of Invention

According to the sensor device according to an embodiment of the invention, signals of frequencies different from each other are generated from two signal generators, and thus it is possible to simply obtain a reference phase difference with a sensor device itself, and it is possible to calculate a reference voltage corresponding to the reference phase difference.

According to the sensor device according to another embodiment of the invention, signals of frequencies different from each other are generated from a signal generator, and thus it is possible to simply obtain a reference phase difference with a sensor device itself, and it is possible to calculate a reference voltage corresponding to the reference phase difference.

According to the sensing method according to still another embodiment of the invention, signals of frequencies different from each other are simultaneously generated from a signal generator, and thus it is possible to simply obtain a reference phase difference, and it is possible to calculate a reference voltage corresponding to the reference phase difference.

DESCRIPTION OF EMBODIMENTS

Figure 1:
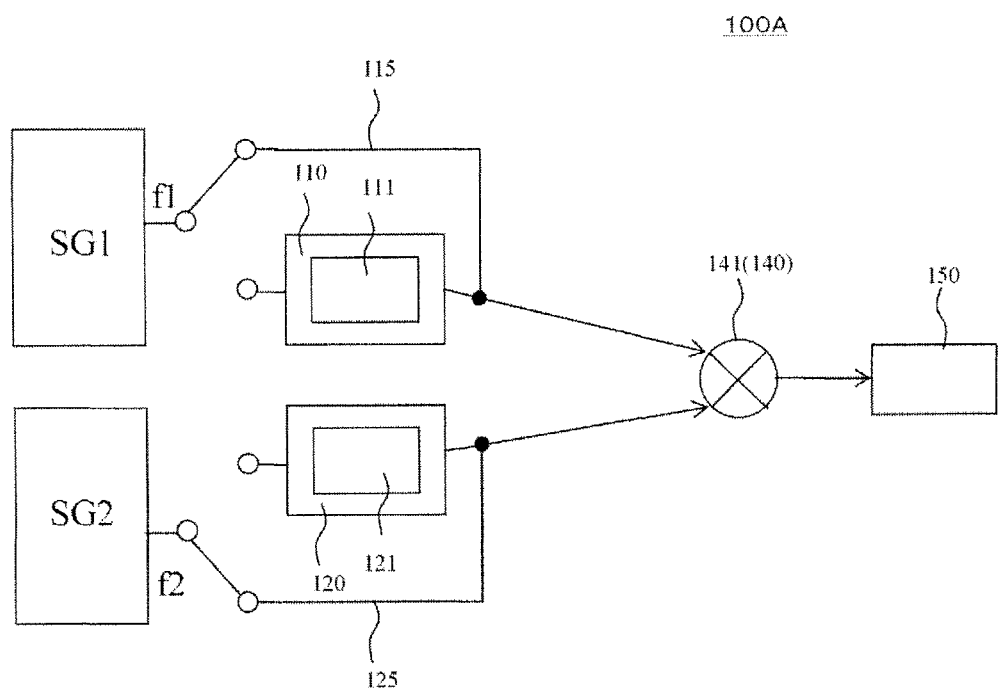
FIG. 1 is a configuration view of a sensor device according to a first embodiment of the invention.
Figure 1:
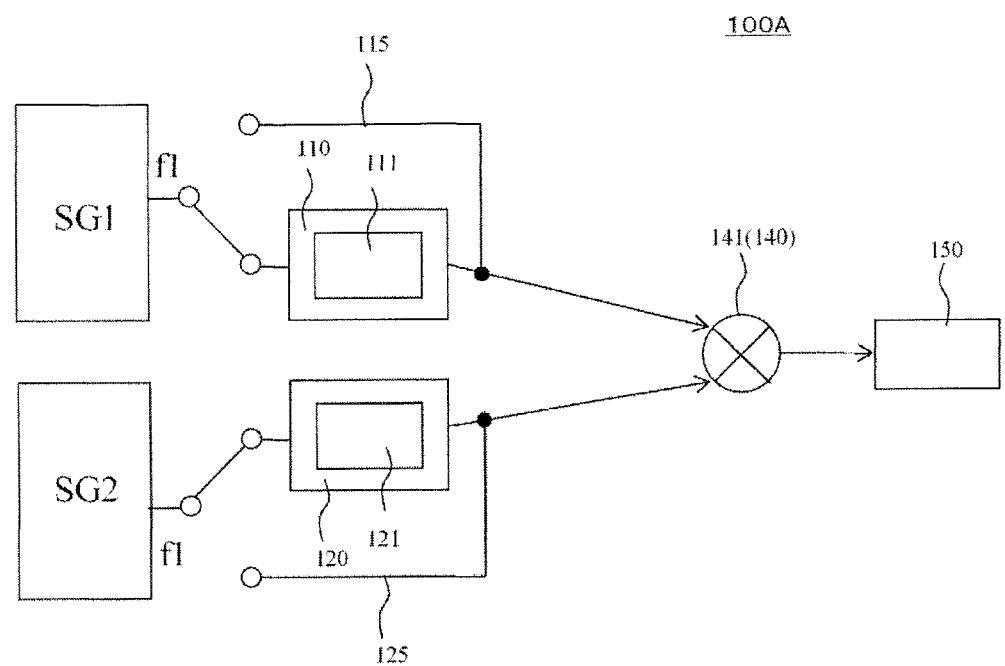

Hereinafter, a sensor device according to an embodiment of the invention will be described in detail with reference to the accompanying drawings. Furthermore, in the following drawings, the same reference numeral will be given to the same constituent member. In addition, dimensions of respective members, a distance between the respective members, and the like are schematically illustrated, and may be different from actual values.

In addition, in the sensor device, an arbitrary direction may be set as an upward direction or a downward direction. However, in the following description, a rectangular coordinate system xyz is defined, a positive side of a z-direction is set as the upward direction, and terminologies such as an upper surface, a lower surface, and the like are used.

First Embodiment

FIG. 1 is a schematic view illustrating the principle of a sensor device 100A according to a first embodiment of the invention.

As illustrated in FIG. 1, the sensor device 100A according to the first embodiment of the invention includes a first signal generator SG1, a second signal generator SG2, a detection element 110, a reference element 120, a first connection wire 115, a second connection wire 125, a calculation part 140, and a measurement part 150.

(First Signal Generator SG1)

The first signal generator SG1 generates at least one of a signal f1 of a first frequency and a signal f2 of a second frequency different from the first frequency. However, the first signal generator SG1 may generate a signal of a frequency other than the frequencies such as a signal of a third frequency without limitation to the signal f1 of the first frequency and the signal f2 of the second frequency.

In this embodiment, the first signal generator SG1 can be selectively connected to one of the first connection wire 115 and the detection element 110. As illustrated in FIG. 1(a), the first signal generator SG1 generates the signal f1 of the first frequency in a state of being connected to the first connection wire 115. In addition, as illustrated in FIG. 1(b), the first signal generator SG1 generates the signal f1 of the first frequency in a state of being connected to the detection element 110.

(Second Signal Generator SG2)

The second signal generator SG2 generates at least one of the signal f1 of the first frequency and the signal f2 of the second frequency. However, as is the case with the first signal generator SG1, the second signal generator SG2 may generate a signal of a frequency other than the frequencies such as the signal of the third frequency without limitation to the signal f1 of the first frequency and the signal f2 of the second frequency.

In this embodiment, the second signal generator SG2 can be selectively connected to one of the second connection wire 125 and the reference element 120. As illustrated in FIG. 1(a), the second signal generator SG2 generates the signal f2 of the second frequency in a state of being connected to the second connection wire 125. In addition, as illustrated in FIG. 1(b), the second signal generator SG2 generates the signal f1 of the first frequency in a state of being connected to the reference element 120.

Here, at least one signal generator of the first signal generator SG1 and the second signal generator SG2 can generate both of the signal f1 of the first frequency and the signal f2 of the second frequency. The other signal generator may generate only one signal of the signal f1 of the first frequency and the signal f2 of the second frequency. In this embodiment, as illustrated in FIG. 1(a) and FIG. 1(b), the first signal generator SG1 is configured to generate only the signal f1 of the first frequency, and the second signal generator SG2 is configured to generate both of the signal f1 of the first frequency and the signal f2 of the second frequency.

(Detection Element 110)

The detection element 110 includes a detection part 111 to which a target present in an analyte is adsorbed or of which a mass varies in accordance with a reaction with the target although not adsorbing the target, but the detection part 111 is not essential in this embodiment (this is true of the following respective sensor devices).

For example, the detection part 111 can be realized by immobilizing a reactive group, which has reactivity of specifically adsorbing the target, to a film of gold (Au) which is not susceptible to electrical properties such as conductivity of the analyte. For example, a DNA, an RNA, an antibody, and the like, which are specifically coupled to the target, can be immobilized onto the Au film. According to this configuration, the mass of the detection part 111 varies in accordance with the amount of the target. Furthermore, the detection part 111 may not adsorb the target itself as long as the detection part 111 specifically reacts with the target and the mass of the detection part 111 varies due to the reaction. For example, a reactive group, which has characteristics of reacting with the target and not reacting with a substance other than the target present in the analyte, may be immobilized to the Au film. Furthermore, it is preferable that the Au film is electrically grounded. According to this configuration, the mass of the detection part 111 varies in accordance with the amount of the target.

In this embodiment, the detection element 110 can be connected to the first signal generator SG1. The connection is not established in FIG. 1(a), and is established in FIG. 1(b).

In addition, as illustrated in FIG. 1(b), an input signal is applied to the detection element 110 from the first signal generator SG1 in such a state that the detection element 110 is connected to the first signal generator SG1. When the input signal, which is applied to the detection element 110 as described above, passes through the detection part 111, the input signal is affected by variation in accordance with variation of the mass of the detection part 111 and the like, and is outputted as a detection signal.

(Reference Element 120)

The reference element 120 includes a reference part 121 which does not adsorb the target present in the analyte or does not react with the target, but the reference part 121 is not essential in this embodiment (this is true of the following respective sensor devices). An output from the reference element 120 is used as a reference value with respect to an output from the detection element 110.

For example, the reference part 121 does not have reactivity of specifically adsorbing the target present in the analyte, or of generating a structural variation to cause a substitution reaction with a substance in the analyte to occur. Specifically, as the reference part 121, an Au film to which the above-described reactive group is not immobilized, or a member including a DNA, an RNA, or the like, which has an approximately the same amount of substance as the above-described reactive group and has a random base sequence, is immobilized onto the Au film can be used. According to this configuration, it is possible to suppress occurrence of a mass variation in the reference part 121 depending on the amount of the target.

In this embodiment, the reference element 120 can be connected to the second signal generator SG2. The connection is not established in FIG. 1(a), and is established in FIG. 1(b).

In addition, as illustrated in FIG. 1(b), an input signal is applied to the reference element 120 from the second signal generator SG2 in such a state that the reference element 120 is connected to the second signal generator SG2. When the input signal, which is applied to the reference element 120 as described, passes through the reference part 121, the input signal is affected by variation corresponding to the reference part 121, and is outputted as a reference signal.

The detection signal and the reference signal, which are obtained as described above, are AC signals, and the reference signal functions as a reference with respect to the detection signal.

(First Connection Wire 115)

The first connection wire 115 has a function of connecting the calculation part 140 to the first signal generator SG1.

In this embodiment, the first connection wire 115 is connected to the calculation part 140 as illustrated in FIG. 1(a), and is selectively connected to the first signal generator SG1 as illustrated in FIG. 1(a) and FIG. 1(b).

In addition, as illustrated in FIG. 1(a), the signal f1 of the first frequency is generated from the first signal generator SG1 in such a state that the calculation part 140 is connected to the first signal generator SG1 through the first connection wire 115, and thus the calculation part 140 obtains a first reference signal.

(Second Connection Wire 125)

The second connection wire 125 has a function of connecting the calculation part 140 to the second signal generator SG2.

In this embodiment, the second connection wire 125 is connected to the calculation part 140 as illustrated in FIG. 1(a), and is selectively connected to the second signal generator SG2 as illustrated in FIG. 1(a) and FIG. 1(b).

In addition, as illustrated in FIG. 1(a), the signal f2 of the second frequency is generated from the second signal generator SG2 in such a state that the calculation part 140 is connected to the second signal generator SG2 through the second connection wire 125, and thus the calculation part 140 obtains a second reference signal.

(Calculation Part 140)

The calculation part 140 can calculate a reference voltage based on signals which are generated from the first signal generator SG1 and the second signal generator SG2. For example, the calculation part 140 can be constituted by a mixer and a low pass filter.

Specifically, in this embodiment, as illustrated in FIG. 1(a), the calculation part 140 receives the first reference signal which is obtained by generating the signal f1 of the first frequency from the first signal generator SG1 in a state of being connected to the first signal generator SG1 through the first connection wire 115, and the second reference signal which is obtained by generating the signal f2 of the second frequency from the second signal generator SG2 in a state of being connected to the second signal generator SG2 through the second connection wire 125. In addition, a reference phase difference is generated from the first reference signal and the second reference signal, and a reference voltage corresponding to the reference phase difference can be calculated based on the first reference signal and the second reference signal in accordance with a heterodyne system.

As described above, according to the sensor device 100A according to this embodiment, it is possible to simply obtain the reference voltage with the sensor device itself. Accordingly, for example, in a case where measurement of a detection voltage is performed by connecting a signal generator to an element and the like after calculating the reference voltage, it is possible to reduce occurrence of a measurement variation due to environmental characteristics such as a temperature of a device itself, and variation in magnitude and a frequency of a signal due to element characteristics.

For example, data which is obtained by calculating a reference phase difference and a reference voltage with respect to the reference phase difference can be stored in the calculation part 140 of the sensor device 100A at the time of shipment. According to this, when comparing the data and values obtained by calculating the reference phase difference and the reference voltage corresponding thereto again immediately before measurement, it is possible to determine a state of the sensor device 100A (whether the sensor device 100A is normal or out of order). The following respective sensor devices may be provided with the configuration, the function, and the effect as described above in the same manner.

In addition, in a case of performing measurement by using the detection element 110 and the reference element 120 as described above, the frequency and the magnitude of the signals, which are generated from the first signal generator SG1 and the second signal generator SG2, may be set in accordance with characteristic data of the detection element 110 and the reference element 120. When the reference phase difference and the reference voltage corresponding to the reference phase difference are calculated under the conditions, it is possible to reduce occurrence of variation in magnitude and a frequency of a signal due to element characteristics. The following respective sensor devices may be provided with the configuration, the function, and the effect as described above in the same manner.

In addition, the calculation part 140 may be connected to the detection element 110 and the reference element 120 to calculate a detection voltage.

Specifically, as illustrated in FIG. 1(b), the calculation part 140 receives a first detection signal which is obtained by generating the signal f1 of the first frequency from the first signal generator SG1 in a state of being connected to the first signal generator SG1 and the detection element 110, and a second detection signal (first reference signal) which is obtained by generating the signal f1 of the first frequency from the second signal generator SG2 in a state of being connected to the second signal generator SG2 and the reference element 120. In addition, a detection voltage can be calculated based on the first detection signal and the first reference signal in accordance with the heterodyne system.

Furthermore, in a state of FIG. 1(a), the calculation part 140 may not be connected to the detection element 110 and the reference element 120. According to this configuration, it is possible to effectively prevent accurate measurement from being interrupted by stray capacitance and the like which occur due to the detection element 110 and the reference element 120. Examples of this connection state include FIG. 11(a), FIG. 12(a), FIG. 13(a), and FIG. 14(a). In addition, in a state of FIG. 1(b), the calculation part 140 may not be connected to the first connection wire 115 and the second connection wire 125. According to this configuration, it is possible to effectively prevent accurate measurement from being interrupted by parasitic inductance and the like which occur due to the first connection wire 115 and the second connection wire 125. Examples of this connection state include FIG. 11(b), FIG. 12(b), FIG. 13(b), and FIG. 14(b).

(Measurement Part 150)

Although not being essential in this embodiment (this is true of the following sensor devices), the measurement part 150 calculates a plurality of phase candidate values corresponding the above-described detection voltage with reference to the above-described reference voltage, and selects a detection phase difference which is one of the plurality of phase candidate values (the measurement part 150 also functions as the following selection part 160).

Figure 5:
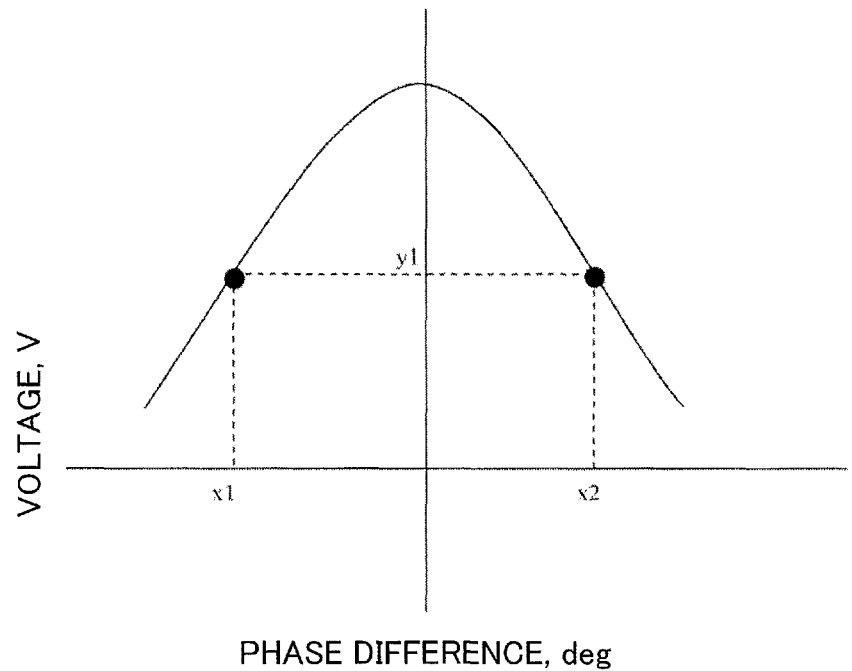
FIG. 5 is a schematic view illustrating signal processing in a heterodyne system.
Figure 5:
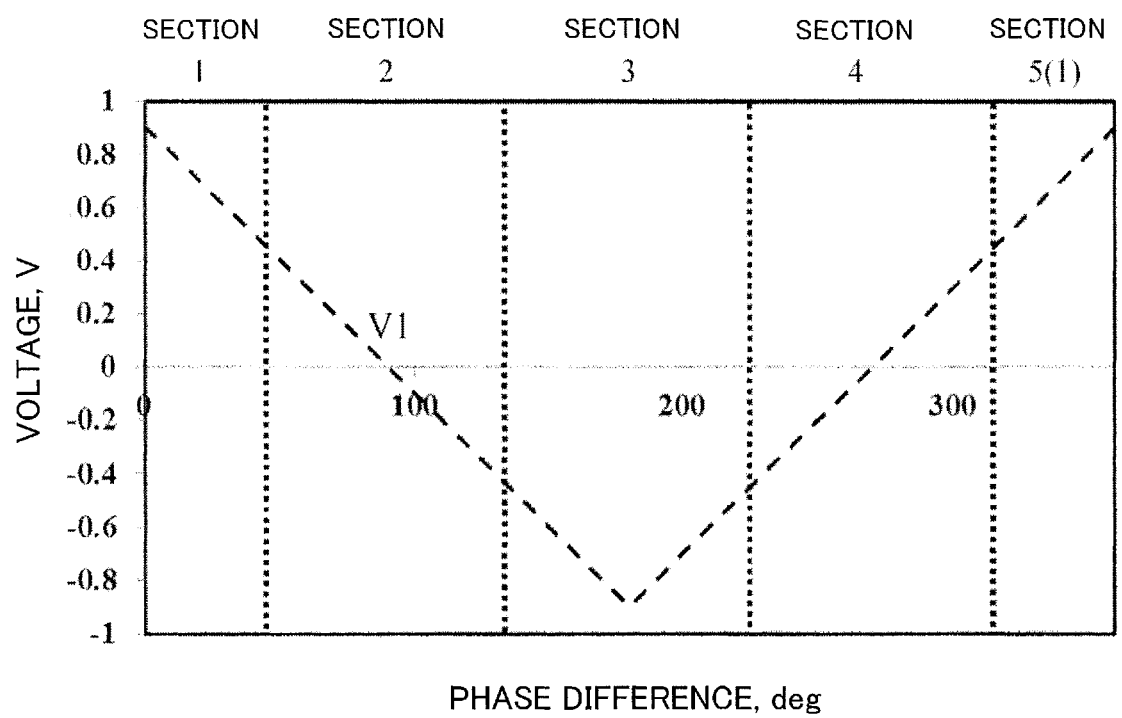

Specifically, since the detection voltage is processed in the calculation part 140 in accordance with the heterodyne system, as illustrated in FIG. 5, the detection voltage shows a sinusoidal curve, and two values of x1 and x2 exist as a phase candidate value corresponding to intensity (output value) y1 of a voltage. The phase candidate value represents a detection phase difference in the detection signal and the reference signal.

In addition, in this embodiment, as a method of selecting the detection phase difference, first, a phase candidate value is calculated from the detection voltage in accordance with the heterodyne system. Here, since the detection voltage is processed in accordance with the heterodyne system, a signal shows a sinusoidal curve which is positive and negative symmetrical to 0°, and two values exist as the phase candidate value on a positive side and a negative side. Next, variation of the detection voltage over time is confirmed.

The detection element 110 has characteristics in which the mass thereof monotonously varies, and thus a phase with respect to the detection voltage monotonously varies over time. For example, from the characteristics, it can be seen that the phase difference is a negative phase difference when the intensity of the detection voltage increases, and the phase difference is a positive phase difference when the intensity of the detection voltage decreases. That is, it is possible to determine the positive and negative of the phase difference by confirming the variation of the detection voltage over time. As described above, according to the sensor device 100A according to this embodiment, it is possible to determine one detection phase difference from two phase candidate values.

Furthermore, as in a sensor device 100B according to a second embodiment to be described later, a configuration comprising a detection amount calculating part 170 may be employed. In this case, it is possible to calculate a detection amount of an analyte based on a detection phase difference selected as described above. According to this configuration, it is possible to provide a sensor device capable of calculating a detection amount of a target in an analyte.

In addition, the sensor device 100A according to this embodiment processes a signal in accordance with the heterodyne system during calculation of the reference voltage and calculation of the detection voltage, but the sensor device 100A may process a signal in accordance with other systems such as an orthogonal modulation system during the calculation of the reference voltage and the calculation of the detection voltage without limitation to the heterodyne system. According to the configuration of processing a signal in accordance with the heterodyne system, it is possible to calculate a detection amount of an analyte by adding only a calculation part which obtains a difference between the detection signal and the reference signal, that is, only a mixer and a low pass filter. According to this, in comparison to an orthogonal modulation system which is used for measurement of a phase difference with a SAW sensor and the like, signal processing can be more simplified, the number of necessary parts becomes smaller, a size can be further reduced, and consumption current can be further suppressed.

Second Embodiment

Figure 2:
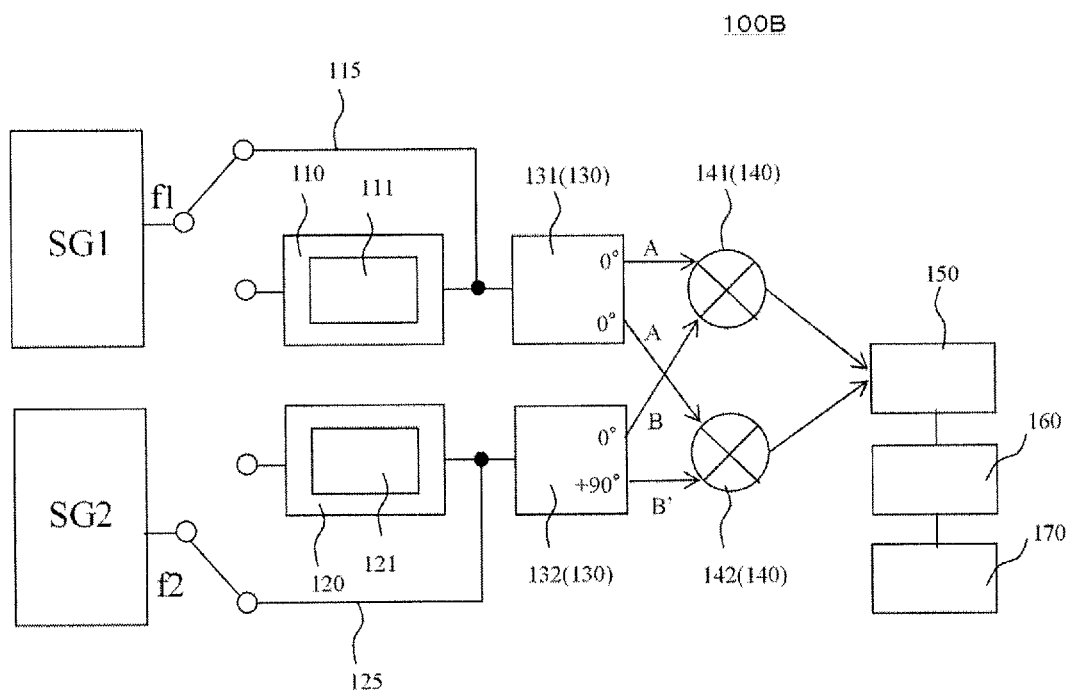
FIG. 2 is a configuration view of a sensor device according to a second embodiment of the invention.
Figure 2:
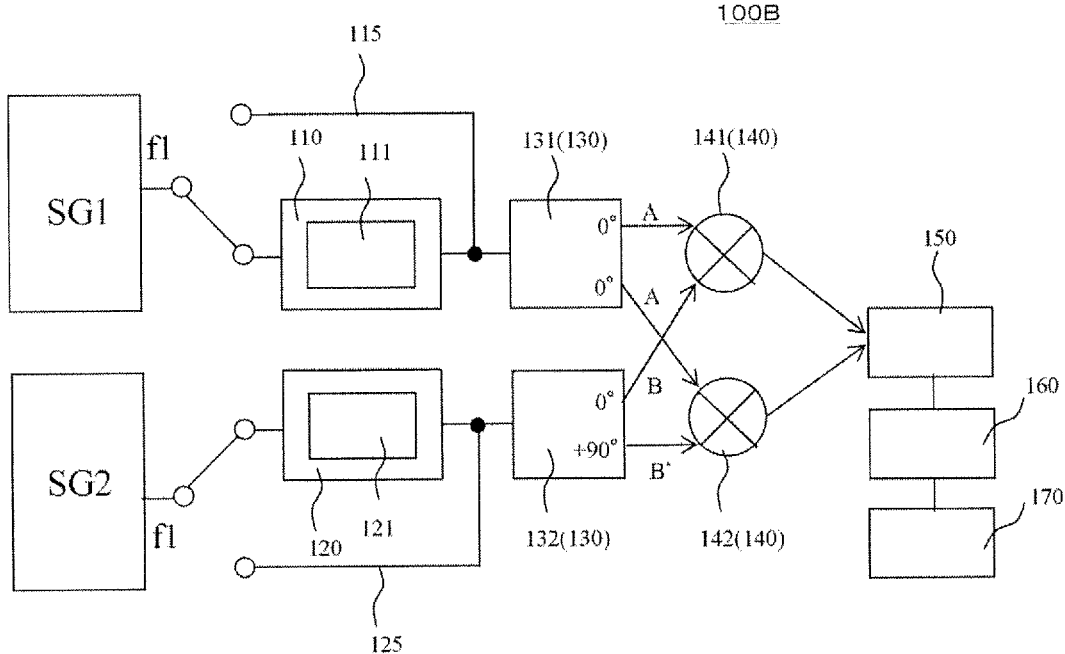

As illustrated in FIG. 2, the sensor device 100B according to the second embodiment of the invention includes a first signal generator SG1, a second signal generator SG2, a detection element 110, a reference element 120, a first connection wire 115, a second connection wire 125, a branch part 130, a calculation part 140, a measurement part 150, a selection part 160, and a detection amount calculating part 170.

In comparison to the sensor device 100A according to the first embodiment, the sensor device 100B according to this embodiment further includes the branch part 130, the selection part 160, and the detection amount calculating part 170, and the calculation part 140 includes a first calculation part 141 and a second calculation part 142.

In the following description, description of the same configuration as in the sensor device 100A according to the first embodiment may be omitted.

(First Connection Wire 115)

The first connection wire 115 has a function of connecting a first branch part 131 to the first signal generator SG1. That is, in this embodiment, the first connection wire 115 connects the first calculation part 141 to the first signal generator SG1 through the first branch part 131.

In this embodiment, the first connection wire 115 is connected to the first branch part 131 as illustrated in FIG. 2(a), and is selectively connected to the first signal generator SG1 as illustrated in FIG. 2(a) and FIG. 2(b).

(Second Connection Wire 125)

The second connection wire 125 has a function of connecting a second branch part 132 to the second signal generator SG2. That is, in this embodiment, the second connection wire 125 connects the second calculation part 142 to the second signal generator SG2 through the second branch part 132.

In this embodiment, the second connection wire 125 is connected to the second branch part 132 as illustrated in FIG. 2(a), and is selectively connected to the second signal generator SG2 as illustrated in FIG. 2(a) and FIG. 2(b).

(Branch Part 130)

In this embodiment, the branch part 130 includes the first branch part 131 and the second branch part 132. For example, the first branch part 131 and the second branch part 132 can be respectively constituted by a splitter, and phases of two signals, which are branched by the splitter on one side, can be made to deviate from each other.

First, in a connection state as illustrated in FIG. 2(a), a first reference signal and a second reference signal are obtained by the first branch part 131 and the second branch part 132. Details thereof are as follows.

As illustrated in FIG. 2(a), the first branch part 131 obtains the first reference signal by generating the signal f1 of the first frequency from the first signal generator SG1 in such a state that the first branch part 131 is connected to the first signal generator SG1 by the first connection wire 115. In addition, the first reference signal is branched into a first branch signal and a second branch signal. Here, the first branch signal and the second branch signal are signals having the same phase. That is, the first reference signal is branched into two same signals A.

As illustrated in FIG. 2(a), the second branch part 132 obtains the second reference signal by generating the signal f2 of the second frequency from the second signal generator SG2 in such a state that the second branch part 132 is connected to the second signal generator SG2 by the second connection wire 125. In addition, the second reference signal is branched into a third branch signal and a fourth branch signal. Here, the third branch signal has the same phase as that of the first branch signal. A phase of the fourth branch signal deviates from the phase of the third branch signal. Here, 180° is excluded from a phase deviation value. In this example, a phase deviation is set to 90°. In FIG. 2, the third branch signal and the fourth branch signal are indicated by B and B', respectively. According to this, the phase of the fourth branch signal is made to deviate from the phase of the first to third branch signals by 90°. Accordingly, in a region, when sensitivity of the first detection voltage is the lowest, sensitivity of the second detection voltage is the highest, and thus it is possible to realize high sensitivity.

Furthermore, in the sensor device 100B according to this embodiment, description has been given of an example in which the reference signal is branched into the third branch signal and the fourth branch signal in a state in which phases deviate from each other. However, signals branched from the detection signal in a state in which phases deviate from each other may be outputted instead of the example. In addition, description has been given of an example in which the phase of the fourth branch signal is made to deviate from the phase of the first branch signal by 90°, but the deviation of the phase may be set to values other than 90° as long as 180° is excluded.

Furthermore, for example, it is possible to employ a configuration in which branch signals having the same phase are obtained by branching a signal into two signals in the first branch part 131, a signal is branched into two signals in the second branch part 132, and a line length on one side is made to be different from a line length on the other side. According to this, phases of the branch signals may be made to deviate from each other.

Here, the phase deviation in the respective branch signals in the branch part 130 (the first branch part 131 and the second branch part 132) is set in such a manner that a first reference phase difference calculated as a value obtained by subtracting the third branch signal B from the first branch signal A in the following first calculation part 141, and a second reference phase difference calculated as a value obtained by subtracting the fourth branch signal B' from the second branch signal A in the following second calculation part 142 become different from each other. The setting of the phase deviation as described above is also true of another branch part 130 and a sensor device 100 in another embodiment.

Next, in a connection state as illustrated in FIG. 2(b), a detection signal and a reference signal are obtained by the first branch part 131 and the second branch part 132 in the same manner as in the above-described reference signal. Details thereof are as follows.

As illustrated in FIG. 2(b), the first branch part 131 obtains a detection signal by generating the signal f1 of the first frequency from the first signal generator SG1 in such a state that the first signal generator SG1, the detection element 110, and the first branch part 131 are connected to each other without using the first connection wire 115. In addition, the detection signal is branched into a first branch signal and a second branch signal. Here, the first branch signal and the second branch signal are signals having the same phase. That is, the detection signal is branched into two same signals. In FIG. 2, both of the first branch signal and the second branch signals are indicated by a symbol A.

As illustrated in FIG. 2(b), the second branch part 132 obtains a reference signal by generating the signal f1 of the first frequency from the second signal generator SG2 in such a state that the second signal generator SG2, the reference element 120, and the second branch part 132 are connected to each other without using the second connection wire 125. In addition, the reference signal is branched into a third branch signal and a fourth branch signal. A phase of the third branch signal is the same phase as that of the first branch signal. Here, a phase of the fourth branch signal is made to deviate from the phase of the first branch signal by a value excluding 180°. In this example, a phase deviation is set to 90°. In FIG. 2, the third branch signal and the fourth branch signal are indicated by a symbol B and a symbol B', respectively.

(Calculation Part 140)

In this embodiment, the calculation part 140 includes the first calculation part 141 and the second calculation part 142.

The calculation part 140 obtains a reference voltage or a detection voltage based on the first branch signal A and the second branch signal A which are branched from the first reference signal or the detection signal, and the third branch signal B and the fourth branch signal B' which are branched from the second reference signal or the reference signal, for example, in accordance with the heterodyne system. Determination as to which of the reference voltage and the detection voltage is obtained is made in accordance with establishment or non-establishment of connection between a signal generator and an element. For example, the first calculation part 141 and the second calculation part 142 can be constituted by a mixer and a low pass filter.

Specifically, as described above, in such a state that respective constituent elements are connected as illustrated in FIG. 2(*a*), the first calculation part 141 obtains a first reference phase difference which is a value obtained by subtracting the third branch signal B from the first branch signal A, and obtains a first reference voltage corresponding to the first reference phase difference in accordance with the heterodyne system. The second calculation part 142 obtains a second reference phase difference which is a value obtained by subtracting the fourth branch signal B' from the second branch signal A, and calculates a second reference voltage corresponding to the second reference phase difference in accordance with the heterodyne system.

In addition, in such a state that respective constituent elements are connected as illustrated in FIG. 2(*b*), the first calculation part 141 obtains a first detection phase difference which is a value obtained by subtracting the third branch signal B from the first branch signal A, and obtains a first detection voltage corresponding to the first detection phase difference in accordance with the heterodyne system. The second calculation part 142 obtains a second detection phase difference which is a value obtained by subtracting the fourth branch signal B' from the second branch signal A, and calculates a second detection voltage corresponding to the second detection phase difference in accordance with the heterodyne system.

Figure 6:
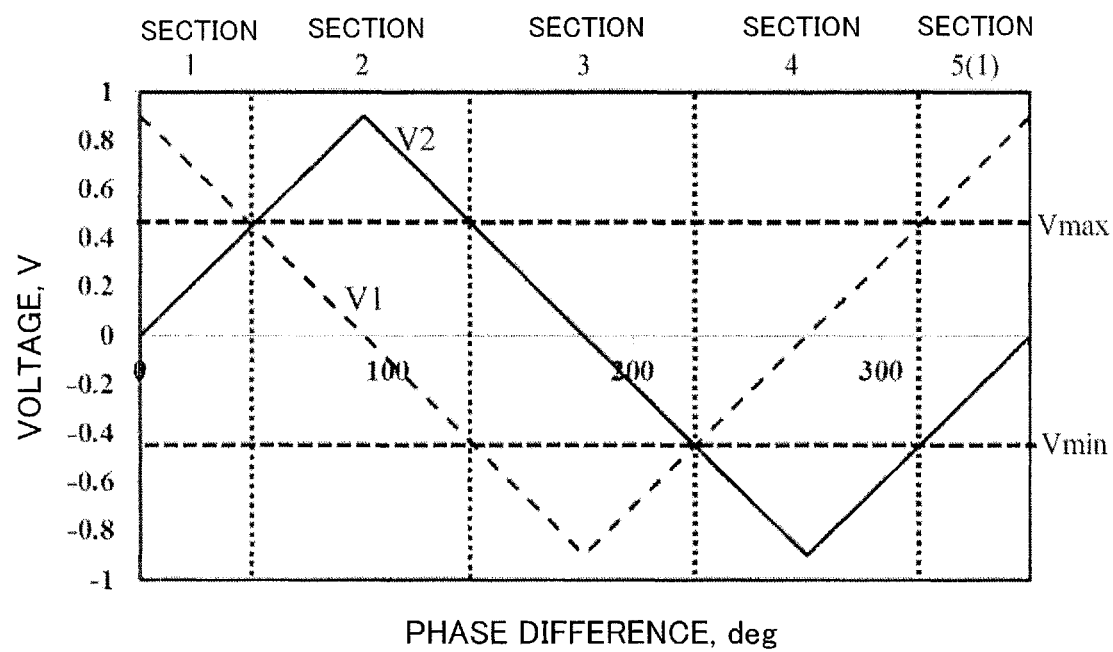
FIG. 6($a$) is a diagram illustrating schematic trajectories of a first detection voltage and a second detection voltage, and FIG. 6($b$) is a diagram illustrating a trajectory of a detection voltage which is selected.
Figure 6:
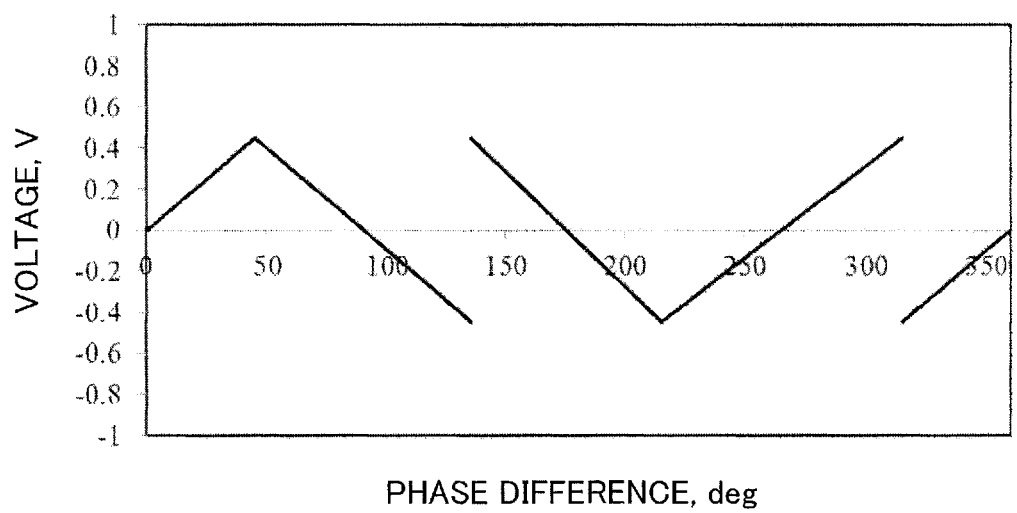

As described above, according to the sensor device 100B according to this embodiment, signals of predetermined frequencies are generated from the two signal generators while changing a connection configuration between the two signal generators and the two calculation parts, and thus it is possible to simply calculate a reference voltage as illustrated in FIG. 6(*a*) with the sensor device itself. In addition, the sensor device 100B can exhibit the same effect as in the sensor device 100A according to the first embodiment.

(Measurement Part 150)

The measurement part 150 calculates two first phase candidate values from the first detection voltage, and determines one of the two first phase candidate values as a first detection phase difference. Similarly, the measurement part 150 calculates two phase candidate values from the second detection voltage, and determines one of the two phase candidate values as a second detection phase difference.

Here, even in this embodiment, since the first detection voltage and the second detection voltage are processed in accordance with the heterodyne system, the first detection voltage and the second detection voltage show a sinusoidal curve as illustrated in FIG. 5(*a*), and two values x1 and x2 exist as a phase candidate value corresponding to intensity (output value) y1 of a voltage. The phase candidate value represents a detection phase difference in the detection signal and the reference signal.

Specifically, when an examination is made on the first detection voltage and the second detection voltage, two first phase candidate values x11 and x21 exist with respect to the first detection voltage. Similarly, two second phase candidate values x12 and x22 exist with respect to the second detection voltage. Here, among a total of four combinations including a combination of x11 and x12, a combination of x11 and x22, a combination of x21 and x12, and a combination of x21 and x22, phase candidate values, which constitute a combination with the closest values (values of a phase difference), are respectively set as a first detection phase difference corresponding to the first detection voltage and a second detection phase difference corresponding to the second detection voltage. That is, a difference is obtained with respect to the four combinations, and a combination in which a value of the difference is the smallest is selected. In addition, the phase candidate values, which constitute the selected combination, are respectively set as the first detection phase difference corresponding to the first detection voltage and the second detection phase difference corresponding to the second detection voltage. The above-described setting is made in accordance with the following mechanism.

Theoretically, one of the two first phase candidate values of the first reference voltage and one of the two second, phase candidate values of the second reference voltage become the same as each other. The same value is a correct phase difference (the first reference phase difference, the second reference phase difference). However, in the first detection voltage and the second detection voltage which are actually measured, there is a possibility that it is difficult to obtain a completely same value due to an error. According to this, a combination in which a difference is the smallest (that is, the closest value is obtained) is set as a correct phase difference, and determination is made as the first detection phase difference and the second detection phase difference.

(Selection Part 160)

The selection part 160 selects one detection phase difference from the first detection phase difference and the second detection phase difference which are obtained in the measurement part 150.

Specifically, in the first detection phase difference and the second detection phase difference which are obtained as described above, a phase difference in which a signal output value (for example, V1, V2) is closer to a predetermined reference value is selected as a detection phase difference. According to this, it is possible to specify a detection phase difference to be selected with the predetermined reference value set as a reference. Here, for example, 0 (zero), a middle point of two pieces of intersection intensity, and the like can be set as the reference value. In a case of using theoretical trajectories as illustrated in FIG. 6, the middle point of the two pieces of intersection intensity as the reference value becomes zero. In addition, the reference value is not limited to the middle point of the two pieces of intersection intensity, and may be set as an appropriate value capable of obtaining a detection voltage with high sensitivity in consideration of the first detection voltage and the second detection voltage.

As described above, according to this embodiment, signal processing is performed by using the two detection signals (the first detection signal and the second detection signal) in accordance with the heterodyne system, and thus it is possible to determine a phase difference from the phase candidate values. Accordingly, it is possible to perform measurement in a wider phase range in comparison to a case of using one detection signal.

(Detection Amount Calculating Part 170)

The detection amount calculating part 170 is connected to the selection part 160.

In the detection amount calculating part 170, a detection amount of an analyte is calculated by using the detection phase difference which is selected in the selection part 160. For example, the detection amount calculating part 170 is provided with data relating to a detection amount of a standard analyte in advance, and the detection amount calculating part 170 compares the data and a value obtained through actual measurement to calculate the detection amount of the analyte.

According to the configuration as described above, it is possible to provide a sensor device capable of calculating a detection amount of a target present in an analyte.

According to the sensor device 100B according to this embodiment, it is possible to exhibit the same effect as in the sensor device 100A according to the first embodiment.

In addition to the effect, the following effect is exhibited.

First, in a typical heterodyne system, the positive and negative of the phase difference is not determined, and thus a measurable phase range is only a range of 0° to 180°. In contrast, according to the sensor device 100B according to this embodiment, the first detection voltage and the second detection voltage, and the first phase candidate value and the second phase candidate value are compared with each other to determine the positive and negative of the phase selected from the phase candidate values. According to this, it is possible to estimate a detection phase difference. As a result, a measurable phase range can be broadened to a range of −180° to 180°. In addition, measurement is possible in a phase range exceeding 180° by continuously measuring a voltage intensity variation of the first detection voltage and the second detection voltage.

In addition, in the typical heterodyne system, the detection voltage shows a sinusoidal curve, and thus an inclination decreases at a phase difference of 0° and ±180°. As a result, there is a concern that sensitivity becomes low or an error increases. In contrast, according to the sensor device 100B according to this embodiment, a region in which the inclination decreases is removed, and thus a detection voltage in which the inclination is great in the entirety of phase range is used. According to this, a voltage variation rate is set to be high with respect to a phase variation, and thus it is possible to realize high sensitivity. Particularly, in the sensor device, the vicinity of a phase difference of 0° may correspond to a rising portion of a signal variation due to detection of a target in many cases, and thus it is required for measurement to be carried out with high sensitivity. Accordingly, the sensor device 100B according to this embodiment can exhibit an excellent effect.

In addition, it is possible to make a determination on a noise by using the two detection voltages (the first detection voltage and the second detection voltage). This determination is made in accordance with the following mechanism. A noise may be mixed in a detection signal and a reference signal. Typically, it is difficult to determine the noise as a noise. In contrast, according to the sensor device 100B according to this embodiment, in a case where measurement is correctly carried out without mixing-in of the noise, one of the first detection voltage and the second detection voltage takes a value of which voltage intensity is in a range of intersection intensity Vmax and intersection intensity Vmin, and the other takes a value of which the voltage intensity is out of the range. In other words, in a case where all of the first detection voltage and the second detection voltage take values in the range, or values out of the range, determination can be made as a noise. In this manner, it is possible to determine the noise. Accordingly, for example, in a case where it is determined that a noise is mixed in, the resultant measurement result is not employed, and measurement is performed again. As a result, it is possible to perform more accurate measurement without being affected by the noise.

Modified Example of Second Embodiment

Here, description will be given of a modified example which is different from the sensor device 100B according to the second embodiment in contents of the measurement part 150 and the selection part 160. The other configurations are the same as in the sensor device 100B according to the second embodiment. Hereinafter, a measurement part 150' and a selection part 160' in this modified example will be described in detail.

(Measurement Part 150')

The measurement part 150' calculates two first phase candidate values from the first detection voltage, and determines one of the two first phase candidate values as a first detection phase difference. Similarly, the measurement part 150' calculates two second phase candidate values from the second detection voltage, and determines one of the two second phase candidate values as a second detection phase difference.

Specifically, a trajectory with respect to a phase difference between the first detection voltage and the second detection voltage is obtained in advance, and positive intensity and negative intensity at intersections of the first detection voltage and the second detection voltage are obtained as two pieces of intensity. In addition, in the first detection voltage and the second detection voltage, a voltage, which is located between the two pieces of positive intensity and negative intensity at intersections, is selected as a detection voltage. Details are as follows.

FIG. 6(a) is a view illustrating trajectories of theoretical values of the first detection voltage and the second detection voltage. In this embodiment, a theoretical value of the first detection voltage in FIG. 6(a) is regarded as a first reference voltage, and a theoretical value of the second detection voltage is regard as a second reference voltage. An analyte may be sensed by performing actual measurement with the first reference voltage and the second reference voltage set as a reference. For convenience, the intensity of the first detection voltage is set as V1, the intensity of the second detection voltage is set as V2, and intensity at intersections between the trajectory of the first detection voltage and the trajectory of the second detection voltage is set as Vmax and Vmin in the order of the magnitude of values. In addition, the trajectory of the first detection voltage is indicated by a broken line, and the trajectory of the second detection voltage is indicated by a solid line. Theoretically, the intensity Vmax and the intensity Vmin at the intersections are 0.5 times and −0.5 times the maximum intensity of V1 and the maximum intensity of V2, respectively.

Here, a section of a phase value is partitioned for each phase value which takes intensity at an intersection of one of the first detection voltage and the second detection voltage. In FIG. 6(a), a section 1 to a section 5 are illustrated. In addition, the section 1 to the section 4 are repeated, and the section 1 and the section 5 become the same as each other. In addition, the second detection voltage in the section 1, the first detection voltage in the section 2, the second detection voltage in the section 3, the first detection voltage in the section 4, and the second detection voltage in the section 5 are selected as a detection voltage. In other words, the selection is made as follows:

when V1>V2, and V1>Vmax, V2 is employed as the detection voltage;

when V1<V2, and V2>Vmax, V1 is employed as the detection voltage;

when V1<V2, and V1<Vmin, V2 is employed as the detection voltage; and when V1>V2, and V2<Vmin, V1 is employed as the detection voltage.

In a case where a relationship of V1=V2 is established, one of V1 and V2 may be employed as the detection voltage, A trajectory of the detection voltage which is selected as described above is illustrated in FIG. 6(b).

(Selection Part 160')

The selection part 160' selects one detection phase difference from the first detection phase difference and the second detection phase difference which are obtained in the measurement part 150'.

Specifically, in a case where the first detection voltage is set as the detection voltage, the first detection phase difference is set as the detection phase difference. In a case where the second detection voltage is set as the detection voltage, the second detection phase difference is set as the detection phase difference.

As described above, it is possible to calculate the detection amount of the analyte by using the detection phase difference selected in the selection part 160' in the same manner as in the detection amount calculating part 170 in the sensor device 100B according to the second embodiment.

Third Embodiment

Figure 3:
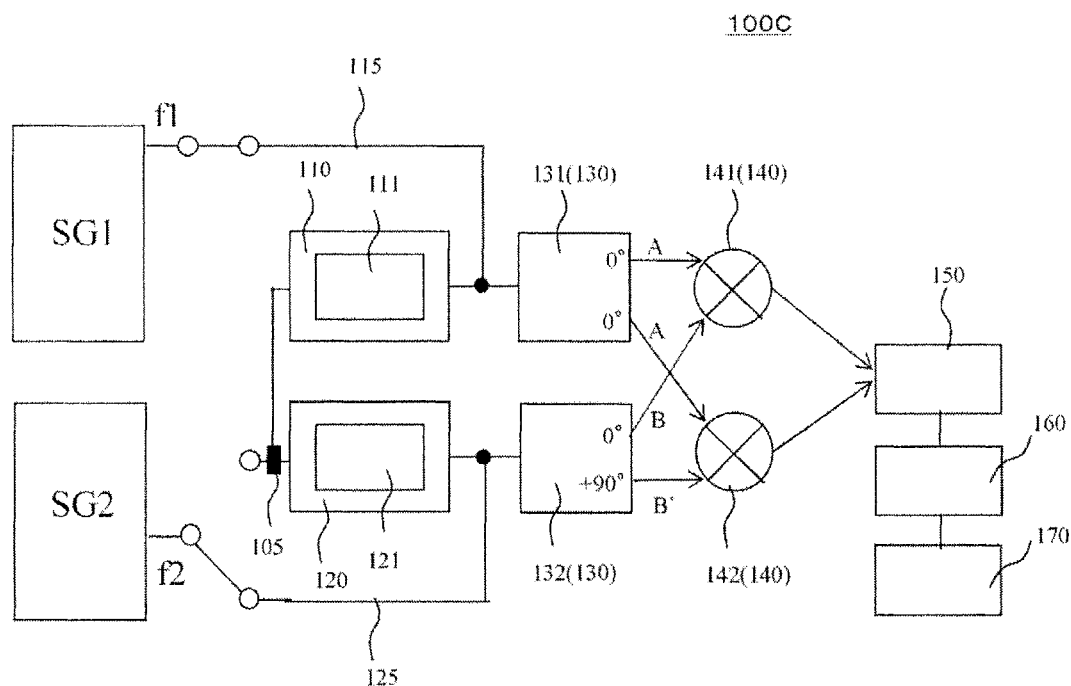
FIG. 3 is a configuration view of a sensor device according to a third embodiment of the invention.
Figure 3:
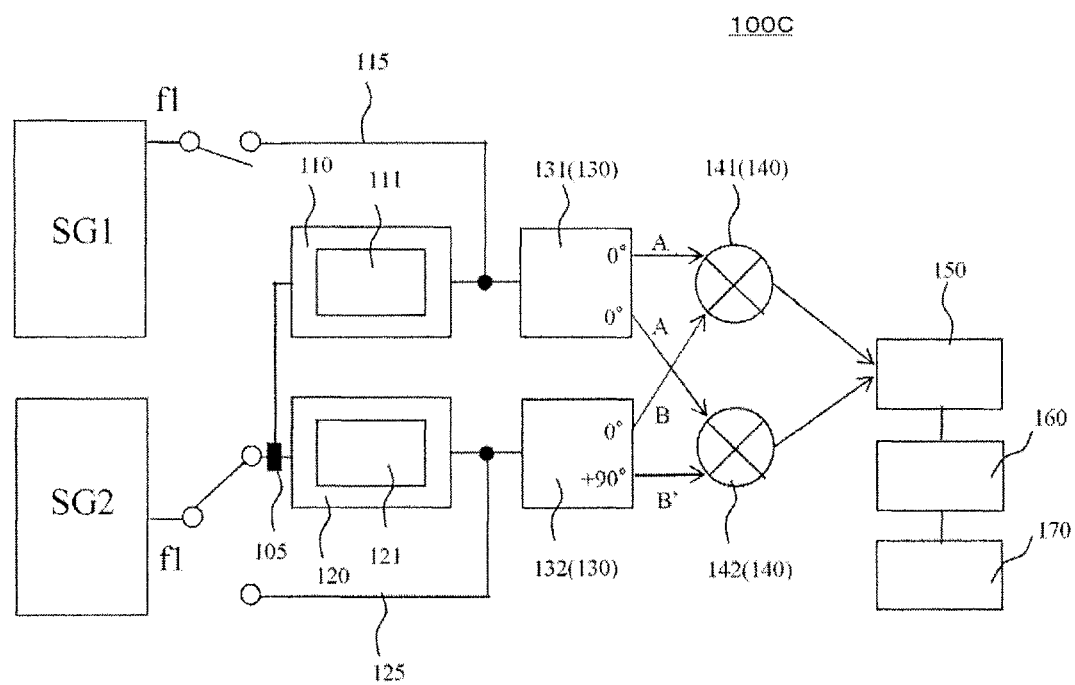

As illustrated in FIG. 3, a sensor device 100C according to a third embodiment includes a first signal generator SG1, a second signal generator SG2, a detection element 110, a reference element 120, an element branch part 105, a first connection wire 115, a second connection wire 125, a branch part 130, a calculation part 140, a measurement part 150, a selection part 160, and a detection amount calculating part 170. Hereinafter, description of the same configuration as in the sensor devices 100A and 100B according to the first and second embodiments may be omitted.

As illustrated in FIG. 1 and FIG. 2, the sensor devices 100A and 100B according to the above-described embodiments have a configuration in which the first signal generator SG1 can be connected to the detection element 110, and the second signal generator SG2 can be connected to the reference element 120.

In contrast, as illustrated in FIG. 3, the sensor device 100C according to this embodiment includes the element branch part 105 which is connected to the detection element 110 and the reference element 120. In addition, the first signal generator SG1 is not connected to the element branch part 105, and the second signal generator SG2 can be connected to the element branch part 105.

In addition, as illustrated in FIG. 3(b), a signal generated from the second signal generator SG2 is inputted to the detection element 110 and the reference element 120 through the element branch part 105. The input signal is detected and processed though the same route as in the sensor device 100B according to the second embodiment. Here, for example, the element branch part 105 can be constituted by a splitter. In addition, as a modified example, a configuration may be employed in which a signal generated from one of the first signal generator SG1 and the second signal generator SG2 is branched into two signals without employing the element branch part 105, and are inputted to a plurality of elements such as the detection element 110 and the reference element 120. In this case, in a case where three or greater elements exist, a switch, which is selectively connectable to two elements to which the signal which is branched into two signals is inputted, may be provided.

In the sensor device 100C according to this embodiment, signals outputted from the first signal generator SG1 and the second signal generator SG2 are as follows. In a connection state of FIG. 3(a), a signal f1 of a first frequency may be outputted from the first signal generator SG1, and a signal f2 of a second frequency is outputted from the second signal generator SG2. In a connection state of FIG. 3(b), the signal f1 of the first frequency may be outputted from the second signal generator SG2.

As described above, even in the sensor device 100C according to this embodiment, as is the case with the above-described embodiments, the signal f1 of the first frequency is generated from the first signal generator SG1 in such a state that the calculation part 140 is connected to the first signal generator SG1, and the signal f2 of the second frequency is generated from the second signal generator SG2 in such a state that the calculation part 140 is connected to the second signal generator SG2. According to this, it is possible to simply obtain the reference phase difference with the sensor device itself, and it is possible to calculate the reference voltage corresponding to the reference phase difference.

In addition to this, even in the sensor device 100C according to this embodiment, it is possible to exhibit the same effect as in the sensor device 100B according to the second embodiment.

Fourth Embodiment

Figure 4:
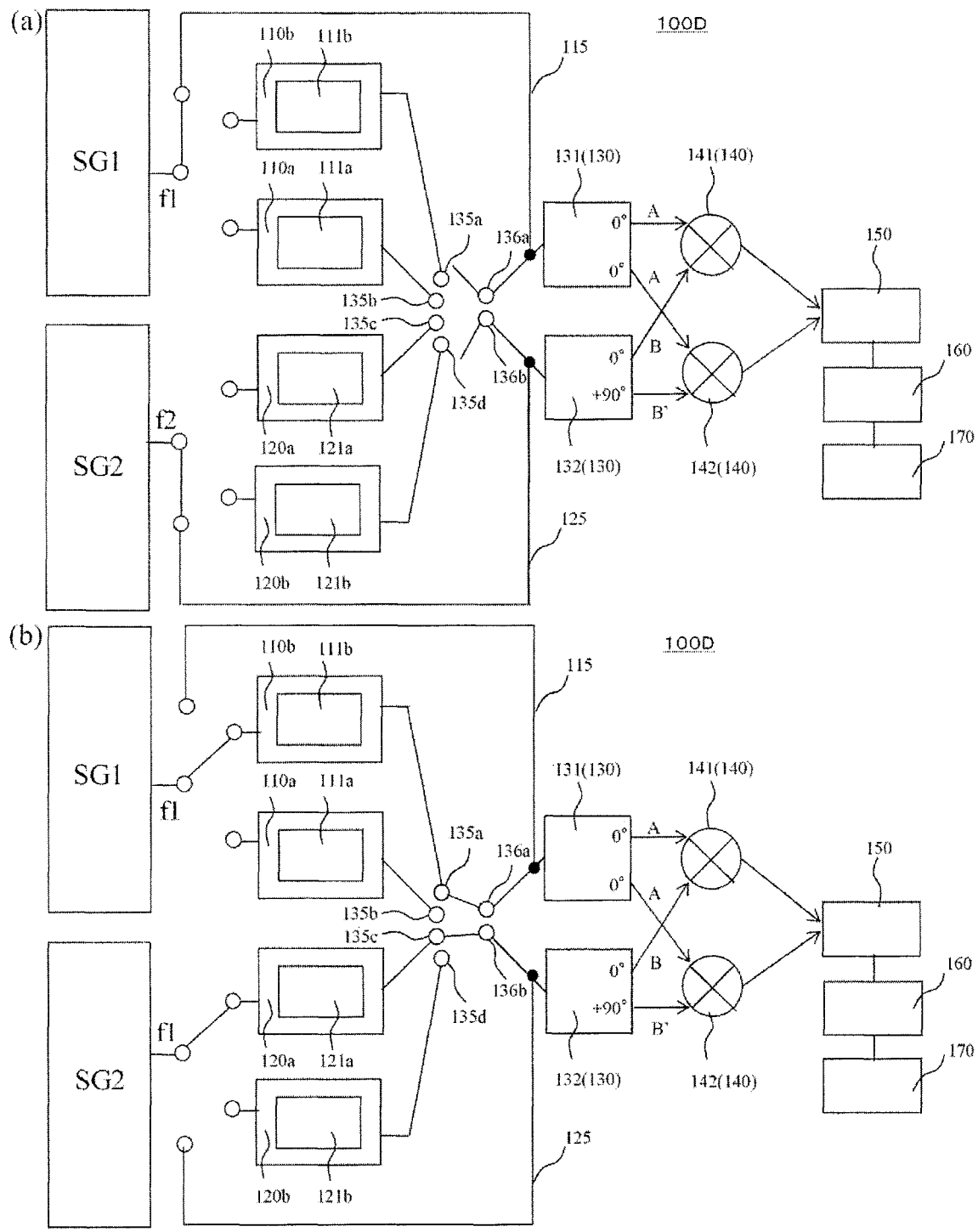
FIG. 4 is a configuration view of a sensor device according to a fourth embodiment of the invention.

As illustrated in FIG. 4, a sensor device 100D according to a fourth embodiment of the invention includes a first signal generator SG1, a second signal generator SG2, a detection element 110a, a detection element 110b, a reference element 120a, a reference element 120b, an element branch part 105, a first connection wire 115, a second connection wire 125, a branch part 130, a calculation part 140, a measurement part 150, a selection part 160, and a detection amount calculating part 170. Hereinafter, description of the same configuration as in the sensor devices 100A to 100C according to the first to third embodiments may be omitted in some cases.

As described in FIG. 1 to FIG. 3, the sensor devices 100A to 100C according to the above-described embodiments have a configuration in which the detection element 110 and the reference element 120 are provided one by one, and the first branch part 131 is connected to one detection element 110, and the second branch part 132 is connected to one reference element 120.

In contrast, as illustrated in FIG. 4, in the sensor device 100D according to this embodiment, the detection element 110 and the reference element 120 are provided two by two. The first branch part 131 can be selectively connected to two detection elements 110a and 110b, and the second branch part 132 can be selectively connected to two reference elements 120a and 120b.

The two detection elements 110a and 110b may be the same as each other or may be different from each other. In a case where the two detection elements 110a and 110b are different from each other, DNAs different from each other, RNAs different from each other, antibodies different from each other, and the like may be respectively immobilized to Au films so that the kinds of targets which are specifically adsorbed thereto become different from each other.

Specifically, the first branch part 131 may be selectively connected to one of the two detection elements 110a and 110b by a switch 136a, and the second branch part 132 may be selectively connected to one of the two reference elements 120a and 120b by a switch 136b.

According to this configuration, it is possible to detect two or greater detection targets included in an analyte at once (by using one analyte) without changing configurations which continue from the branch part 130 (that is, the configurations of the calculation part 140, the measurement part 150, the selection part 160, and the detection amount calculating part 170).

As described above, even in the sensor device 100D according to this embodiment, as is the case with the above-described embodiments, the signal f1 of the first frequency is generated from the first signal generator SG1 in such a state that the calculation part 140 is connected to the first signal generator SG1, and the signal f2 of the second frequency is generated from the second signal generator SG2 in such a state that the calculation part 140 is connected to the second signal generator SG2. Accordingly, it is possible to simply obtain the reference phase difference with the sensor device itself, and it is possible to calculate the reference voltage corresponding to the reference phase difference.

In addition to this, even in the sensor device 100D according to this embodiment, it is possible to exhibit the same effect as in the sensor device 100B according to the second embodiment.

Furthermore, as illustrated in the configuration of the switches 135 and 136 in FIG. 4, for example, each of the first branch part 131 and the second branch part 132 may be arbitrarily connected to one of the two detection elements and the two reference elements instead of the above-described connection configuration.

In addition, for example, the number of the detection element may be set to 3, and the number of the reference element may be set to 1 instead of the above-described element configuration. In this case, one of the first branch part and the second branch part may be connected to the reference element. There is no particular limitation to a configuration in which the other branch part is to be connected to which detection element among the three detection elements, and the configuration may be appropriately set in accordance with the kind and the number of a detection target.

Fifth Embodiment

Figure 15:
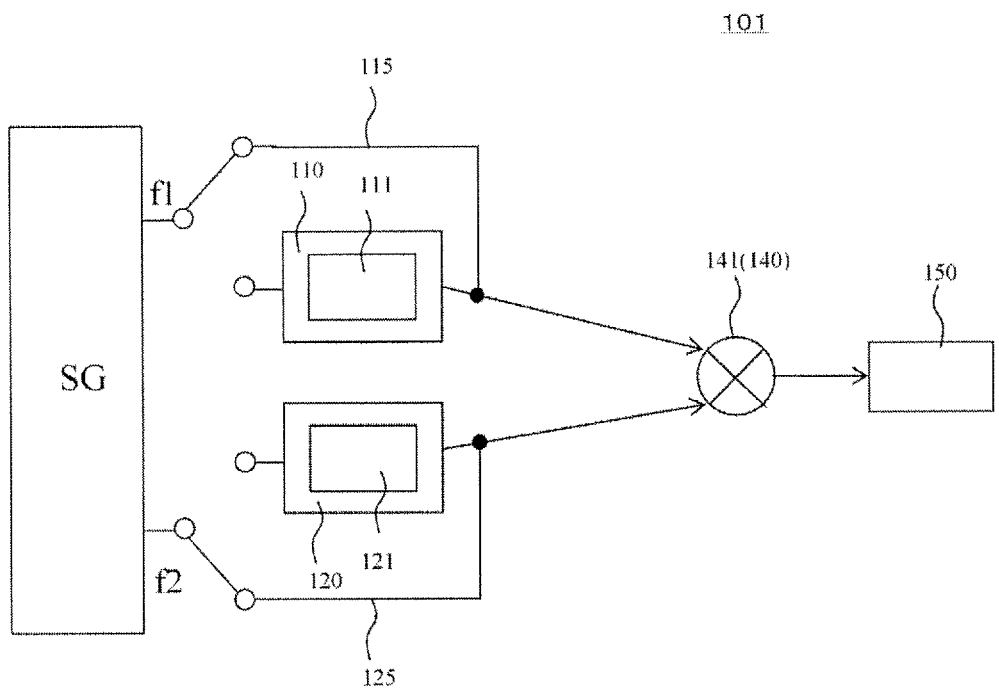
FIG. 15 is a configuration view of a sensor device according to a fifth embodiment of the invention.
Figure 15:
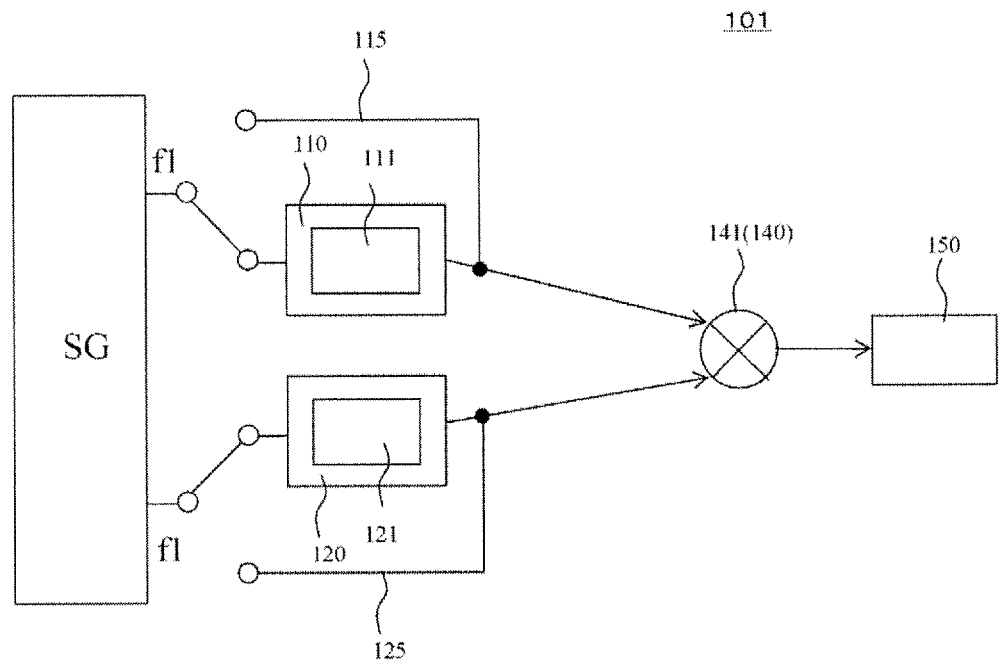

As illustrated in FIG. 15, a sensor device 101 according to a fifth embodiment of the invention includes a signal generator SG, a detection element 110, a reference element 120, a first connection wire 115, a second connection wire 125, a calculation part 140, and a measurement part 150.

The sensor device 101 according to this embodiment is different from the sensor device 100A according to the first embodiment in that the one signal generator SG is provided instead of the two signal generators such as the first signal generator SG1 and the second signal generator SG2.

In the following description, description of the same configuration as in the sensor device 100A according to the first embodiment may be omitted in some cases.

(Signal Generator SG)

The signal generator SG generates signal f1 of a first frequency and a signal f2 of a second frequency which is different from the first frequency. Here, the signal generator SG may generate a signal of a frequency other than the frequencies such as a signal of a third frequency without limitation to the signal f1 of the first frequency and the signal f2 of the second frequency.

In this embodiment, the signal generator SG includes a first output part which outputs at least one of the signal f1 of the first frequency and the signal f2 of the second frequency, and a second output part which outputs at least one of the signal f1 of the first frequency and the signal f2 of the second frequency. The first output part can be selectively connected to one of the first connection wire 115 and the detection element 110, and the second output part can be selectively connected to one of the second connection wire 125 and the reference element 120. In addition, as illustrated in FIG. 15(a), the signal f1 of the first frequency is generated in such a state that the first output part is connected to the first connection wire 115, and the signal f2 of the second frequency is generated in such a state that the second output part is connected to the second connection wire 125. As illustrated in FIG. 15(b), the signal f1 of the first frequency is generated in such a state that the first output part is connected to the detection element 110, and the signal f1 of the first frequency is generated in such a state that the second output part is connected to the detection element 120.

The signal generator SG may output signals simultaneously from the first output part and the second output part. For example, in a connection state illustrated in FIG. 15(a), the signal generator SG outputs the signal f1 from the first output part, and simultaneously outputs the signal f2 of a frequency different from that of the signal f1 from the second output part. In a connection state illustrated in FIG. 15(b), the signal generator SG outputs the signal f1 from the first output part, and simultaneously outputs the signal f1 from the second output part.

(Element Configuration of Sensor Device 100A)

Figure 7:
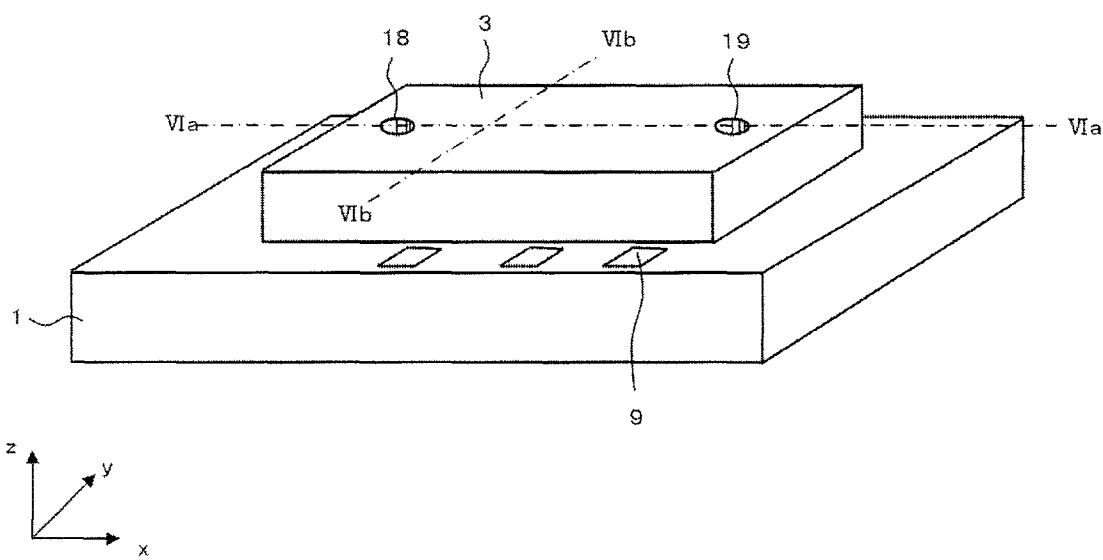
FIG. 7(a) is a perspective view illustrating a part of the sensor device according to the first embodiment of the invention.
FIG. 7(b) is a perspective view illustrating a state in which a part of the sensor device illustrated in FIG. 7(a) is broken.
Figure 7:
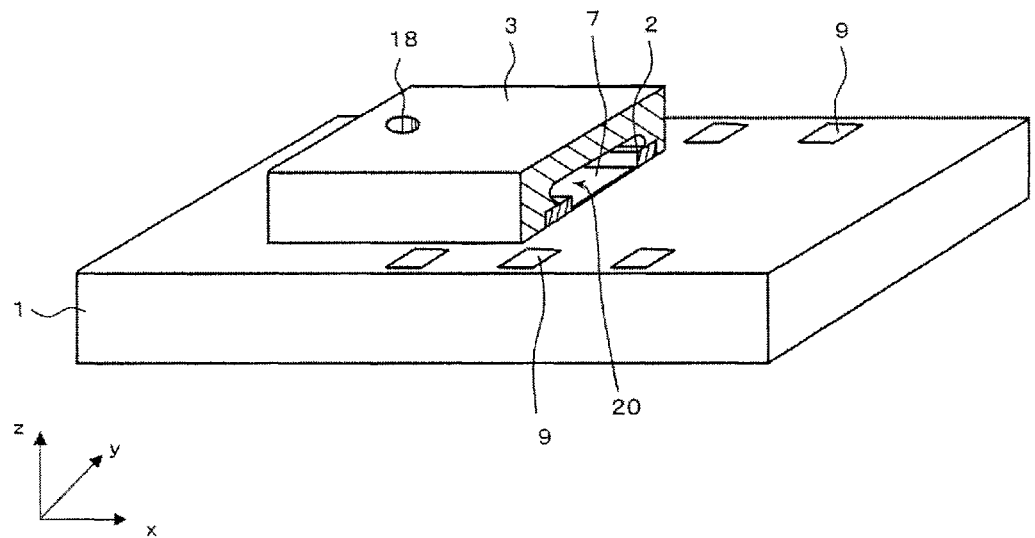

Next, description will be given of a configuration in which the principle of the sensor device according to this embodiment of the invention is embodied. Hereafter, description will be given of an embodied configuration of elements (the detection element 110 and the reference element 120) in the sensor device 100A according to the first embodiment of the invention as an example of the embodiment with reference to FIG. 7 to FIG. 9.

As illustrated in a perspective view of FIG. 7(a), the elements (the detection element 110 and the reference element 120) are mainly constituted by a piezoelectric substrate 1 and a cover 3 from the viewpoint of an external appearance. A first through-hole 18 which is an inlet port of an analyte solution, and a second through-hole 19 which is an air hole or an outlet port of the analyte solution are provided in the cover 3.

FIG. 7(b) is a perspective view of the sensor device 100A when the half of the cover 3 on one side is removed. As illustrated in the same drawing, a space 20, which becomes an analyte flow path of the analyte (solution), is formed on an inner side of the cover 3. The first through-hole 18 is connected to the space 20. That is, the analyte, which enters through the first through-hole 18, flows out into the space 20.

The analyte solution, which flows into the space 20, includes a target, and the target reacts with a detection part which is formed on the piezoelectric substrate 1 and is constituted by a metallic film 7 and the like.

Figure 8:
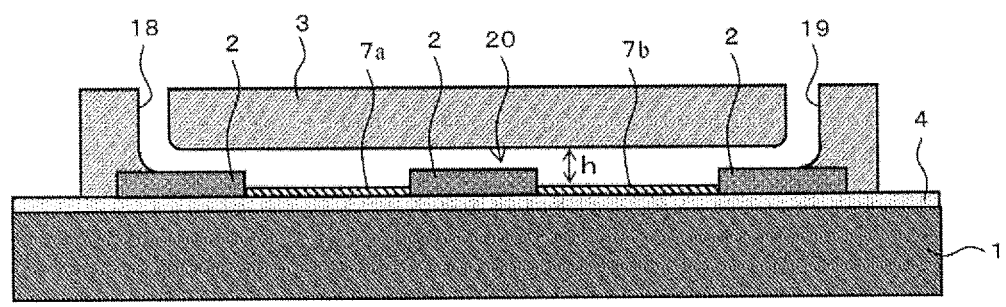
FIG. 8(a) is a cross-sectional view taken along the line VIa-VIa in FIG. 7(a)
FIG. 8(b) is a cross-sectional view taken along the line VIb-VIb in FIG. 7(a)
Figure 8:
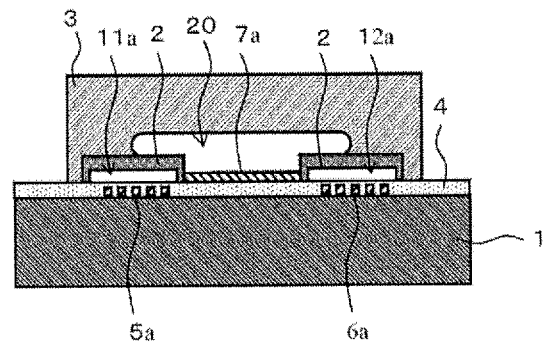
Figure 9:
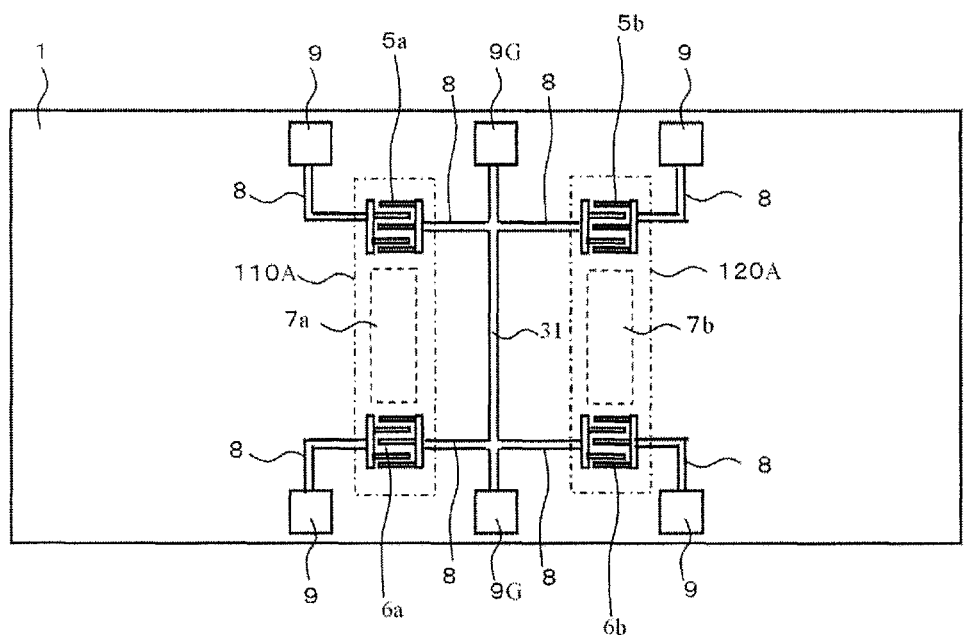
FIG. 9 is a top view of the sensor device illustrated in FIG. 7(a) except for a part thereof.

FIG. 8 is a cross-sectional view of the elements (the detection element 110 and the reference element 120) of the sensor device 100A. FIG. 8(a) is a cross-sectional view taken along the line VIa-VIa in FIG. 7(a), and FIG. 8(b) is a cross-sectional view taken along the line VIb-VIb in FIG. 7(a). FIG. 9 is a top view of the piezoelectric substrate 1, As illustrated in FIG. 8 and FIG. 9, a first detection IDT electrode 5a, a second detection IDT electrode 6a, a first reference IDT electrode 5b, and a second reference IDT electrode 6b are formed on an upper surface of the piezoelectric substrate 1. The first detection IDT electrode 5a and the first reference IDT electrode 5b are configured to generate a predetermined SAW, and the second detection IDT electrode 6a and the second reference IDT electrode 6b are configured to receive the SAW which is generated in each of the first detection IDT electrode 5*a* and the first reference IDT electrode 5*b*. The second detection IDT electrode 6*a* is disposed on a propagation path of the SAW, which is generated in the first detection IDT electrode 5*a*, in order for the second detection IDT electrode 6*a* to receive the SAW which is generated in the first detection IDT electrode 5*a*. The first reference IDT electrode 5*b* and the second reference IDT electrode 6*b* are disposed in the same manner.

The first detection IDT electrode 5*a* and the second detection IDT electrode 6*a* are respectively connected to the pad 9 through a wire 8. A signal is inputted to the first detection IDT electrode 5*a* from an outer side through the pad 9 and the wire 8, and a signal is outputted from the second detection IDT electrode 6*a* to an outer side. The first reference IDT electrode 5*b* and the second reference IDT electrode 6*b* have the same configuration as the first detection IDT electrode 5*a* and the second detection IDT electrode 6*a*. Accordingly, description thereof will be appropriately omitted.

The first detection IDT electrode 5*a*, the second detection IDT electrode 6*a*, the first reference IDT electrode 5*b*, and the second reference IDT electrode 6*b* are covered with a protective film 4. The protective film 4 contributes to prevention of oxidation of respective electrodes and wires, and the like.

As illustrated in FIG. 8(*b*), the first detection IDT electrode 5*a* is accommodated in a first vibration space 11*a*, and the second detection IDT electrode 6*a* is accommodate in a second vibration space 12*a*. According to this, the first detection IDT electrode 5*a* and the second detection IDT electrode 6*a* are isolated from outside air and an analyte solution, and thus it is possible to protect the first detection IDT electrode 5*a* and the second detection IDT electrode 6*a* from a corrosive material such as moisture. In addition, since the first vibration space 11*a* and the second vibration space 12*a* are secured, in the first detection IDT electrode 5*a* and the second detection IDT electrode 6*a*, it is possible to realize a state in which excitation of the SAW is not greatly blocked.

A penetration portion which penetrates through a plate-like body 2 in a thickness direction thereof, is formed between concave portions of the plate-like body 2 in which the first vibration space 11*a* and the second vibration space 12*a* are formed. The penetration portion is provided to form a metallic film 7*a* on the propagation path of the SAW. That is, when the plate-like body 2 is joined to the piezoelectric substrate 1, at least a part of the propagation path of the SAW which propagates from the first detection IDT electrode 5*a* to the second detection IDT electrode 6*a*, is exposed from the penetration portion in a plan view, and the metallic film 7*a* is formed at the exposed portion.

Similarly, another penetration portion which penetrates through the plate-like body 2 in the thickness direction thereof, is formed between the concave portions of the plate-like body 2 in which the first vibration space 11*b* and the second vibration space 12*b* are formed. The penetration portion is provided to form a metallic film 7*b* on the propagation path of the SAW.

For example, the plate-like body 2 having the above-described shape can be formed by using a photosensitive resist.

The metallic film 7*a* which is exposed form the penetration portion of the plate-like body 2, constitutes a detection part for the analyte solution. For example, the metallic film 7*a* has a two-layer structure of a chromium (Cr) layer and a gold (Au) layer which is formed on the chromium layer. For example, aptamers formed of nucleic acid or peptide are immobilized to a surface of the metallic film 7*a*. When the analyte solution comes into contact with the metallic film 7*a* to which the aptamer is immobilized, a specific target substance in the analyte solution is coupled to an aptamer corresponding to the target substance. According to this, the target substance in the analyte is coupled to the aptamer and is adsorbed to the metallic film 7*a*, and thus the mass of the metallic film 7*a* monotonously increases. That is, the mass monotonously increases in accordance with the amount of the target substance in the analyte. In addition, here, the monotonous increase of the mass in the metallic film 7*a* occurs only when the analyte is continuously supplied onto the metallic film 7*a*.

In addition, the metallic film 7*b* which is exposed from the other penetration portion of the plate-like body 2 constitutes a reference part. For example, the metallic film 7*b* has a two-layer structure of a chromium layer and a gold layer which is formed on the chromium layer. The aptamer which is immobilized to the metallic film 7*a*, is not attached to the surface of the metallic film 7*a* so as not to exhibit reactivity with respect to the analyte. In addition, a surface treatment of lowering reactivity with respect to the analyte solution for stabilization may be performed.

When measuring properties of the analyte solution and the like by using the SAW, first, a predetermined voltage (signal) is applied to the first detection IDT electrode 5*a* from an external measurement device through the pad 9 and the wire 8. In this case, in a region in which the first detection IDT electrode 5*a* is formed, the surface of the piezoelectric substrate 1 is excited, and thus a SAW having a predetermined frequency is generated. A part of the generated SAW passes through a region between the first detection IDT electrode 5*a* and the second detection IDT electrode 6*a*, and reaches the second detection IDT electrode 6*a*. At this time, in the metallic film 7*a*, the aptamer which is immobilized to the metallic film 7*a*, is coupled to a specific target substance in the analyte, and the weight (mass) of the metallic film 7*a* varies by the amount of the coupled target substance. Accordingly, phase characteristics of the SAW which passes through a lower side of the metallic film 7*a*, and the like vary. When the SAW of which characteristics vary as described above, reaches the second detection IDT electrode 6*a*, a voltage in accordance with the SAW occurs in the second detection IDT electrode 6*a*. The voltage is outputted to an outer side as a detection signal of an AC signal through the wire 8 and the pad 9. It is possible to investigate properties or components of the analyte solution by processing the detection signal through the branch part 130 and the calculation part 140 as illustrated in FIG. 1.

That is, the piezoelectric substrate 1, the metallic film 7*a* formed on the piezoelectric substrate 1 as a detection part, the first detection IDT electrode 5*a*, and the second detection IDT electrode 6*a* constitute a detection element 110A.

Similarly, the additional metallic film 7*b* to which an aptamer is not immobilized, is provided in the same space 20, and a signal is inputted from the first reference IDT electrode 5*b*. An AC signal which is outputted from the second reference IDT electrode 6*b*, is set as a reference signal which is used for calibration of a signal variation in accordance with an environmental variation such as a temperature characteristic and humidity.

That is, the piezoelectric substrate 1, the metallic film 7*b* formed on the piezoelectric substrate 1 as a reference part, the first reference IDT electrode 5*b*, and the second reference IDT electrode 6*b* constitute a reference element 120A.

Furthermore, as illustrated in FIG. 9, one of a pair of comb-like electrodes which constitute each of the first detection IDT electrode 5a, the second detection IDT electrode 6a, the first reference IDT electrode 5b, and the second reference IDT electrode 6b, is connected to a reference potential line 31. The reference potential line 31 is connected to a pad 9G, and becomes a reference potential. In addition, in the pair of comb-like electrodes which constitute each of the first detection IDT electrode 5a, the second detection IDT electrode 6a, the first reference IDT electrode 5b, and the second reference IDT electrode 6b, the electrode which is connected to the reference potential is disposed on a side at which the reference potential line 31 is disposed. In other words, in the pair of comb-like electrodes, an electrode, which is located on an inner side, is connected to the reference potential. In this configuration, it is possible to suppress cross-talk of signals of the detection element 110A and the reference element 120A therebetween.

The invention is not limited to the above-described embodiments, and can be executed in various aspects.

Figure 10:
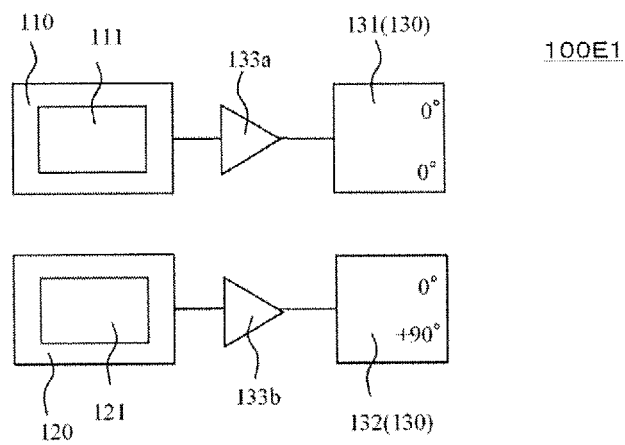
FIG. 10 is a configuration view of a sensor device according to a modified example of the embodiment of the invention.
Figure 10:
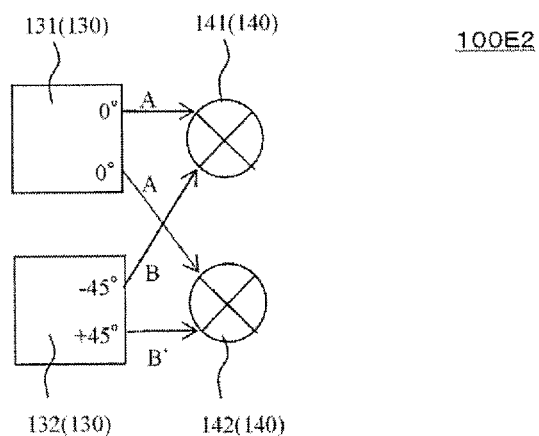
Figure 10:
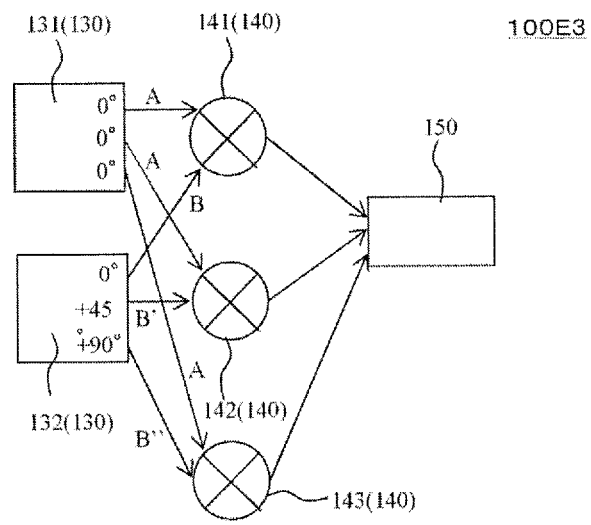
Figure 11:
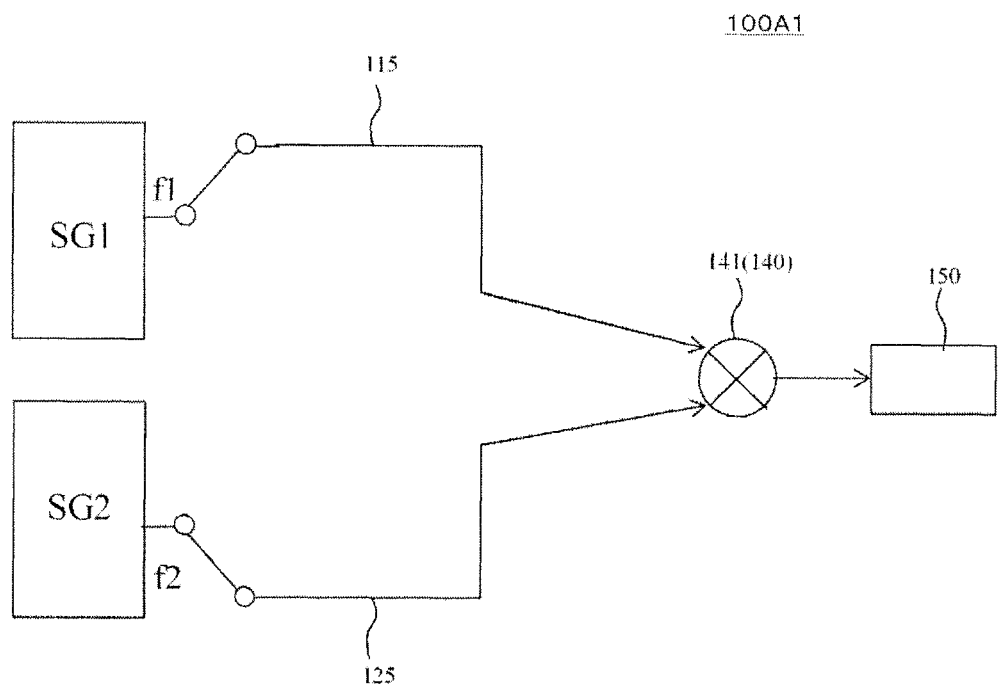
FIG. 11 is a configuration view illustrating a modified example of the sensor device according to the first embodiment of the invention as illustrated in FIG. 1, wherein a detection element and a reference element are not provided.
Figure 11:
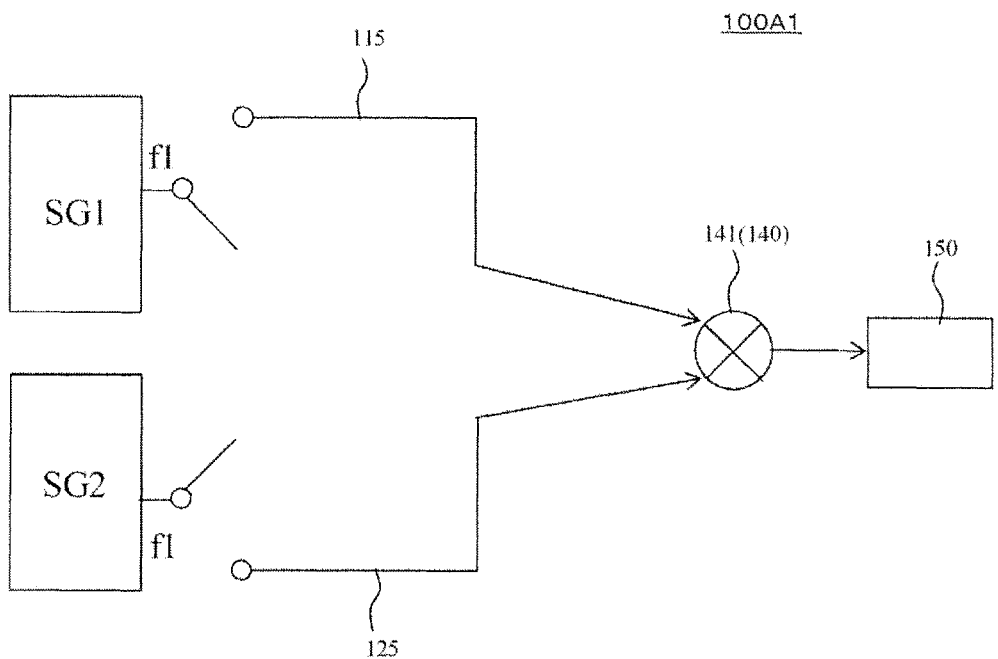
Figure 12:
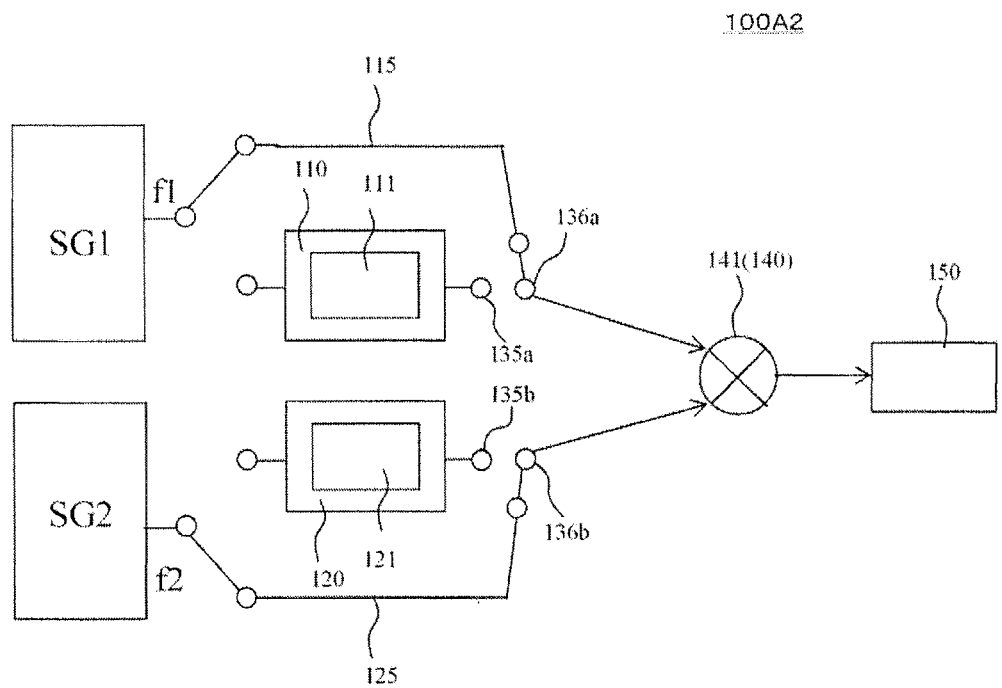
FIG. 12 is a configuration view illustrating a modified example of the sensor device according to the first embodiment of the invention as illustrated in FIG. 1, wherein a switch capable of selecting a connection state between a calculation part, and a connection wire and an element is provided.
Figure 12:
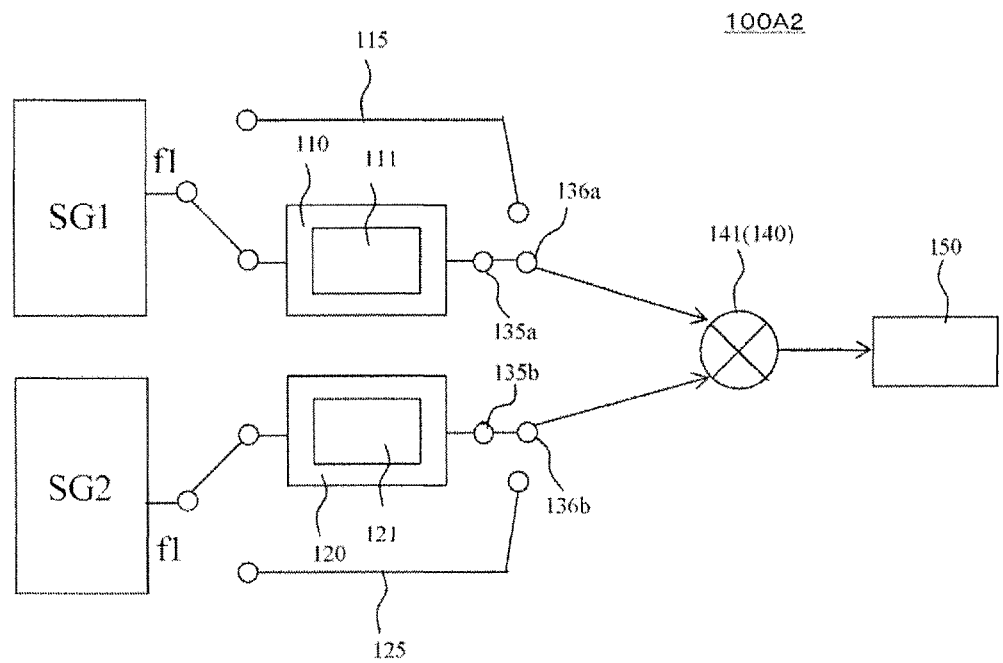
Figure 13:
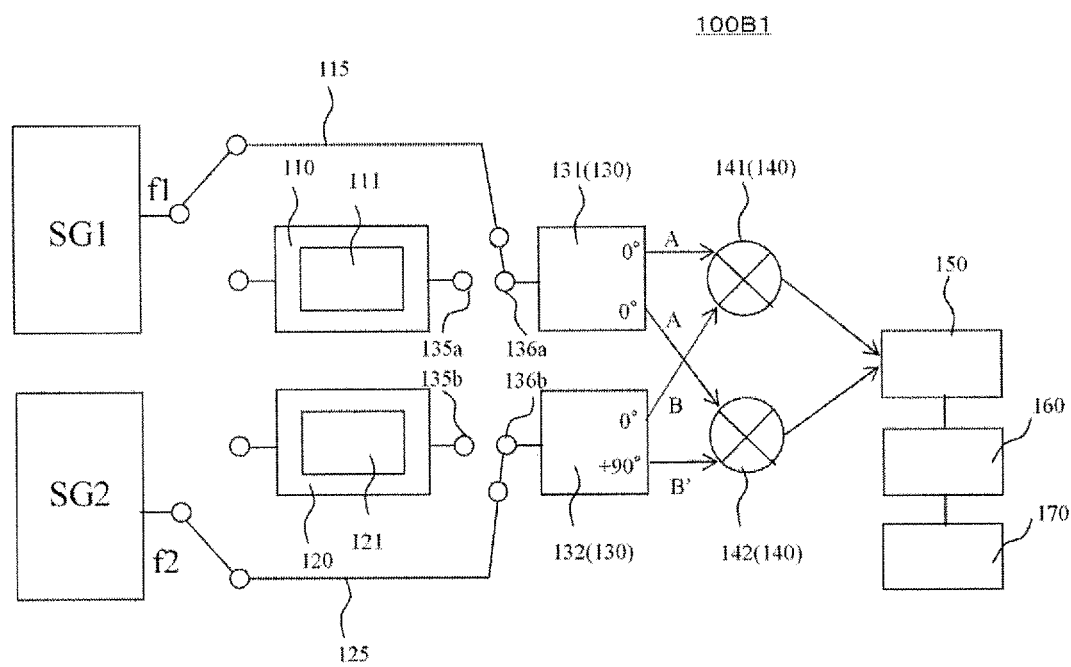
FIG. 13 is a configuration view illustrating a modified example of the sensor device according to the second embodiment of the invention as illustrated in FIG. 2, wherein a switch capable of selecting a connection state between a branch part, and a connection wire and an element is provided.
Figure 13:
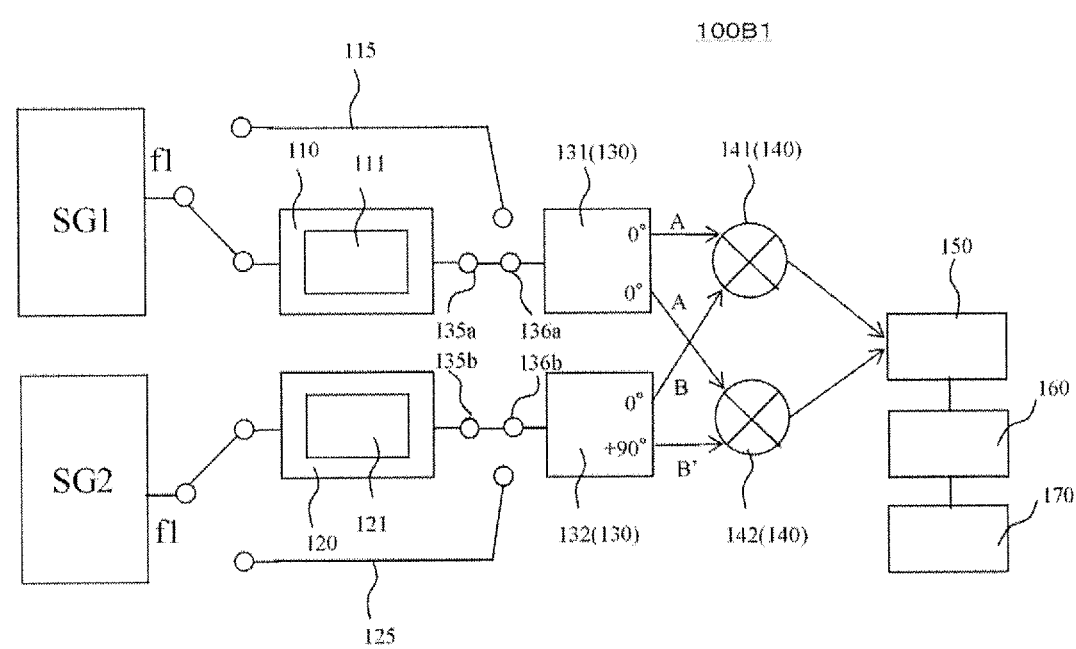
Figure 14:
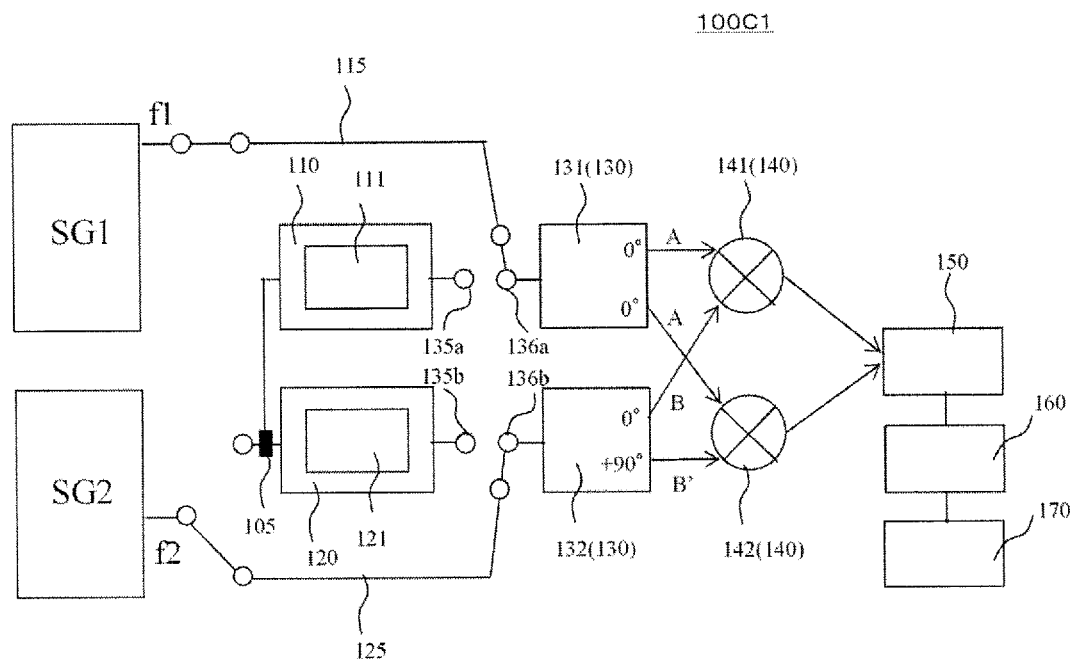
FIG. 14 is a configuration view illustrating a modified example of the sensor device according to the third embodiment of the invention as illustrated in FIG. 3, wherein a switch capable of selecting a connection state between a branch part, and a connection wire and an element is provided.
Figure 14:
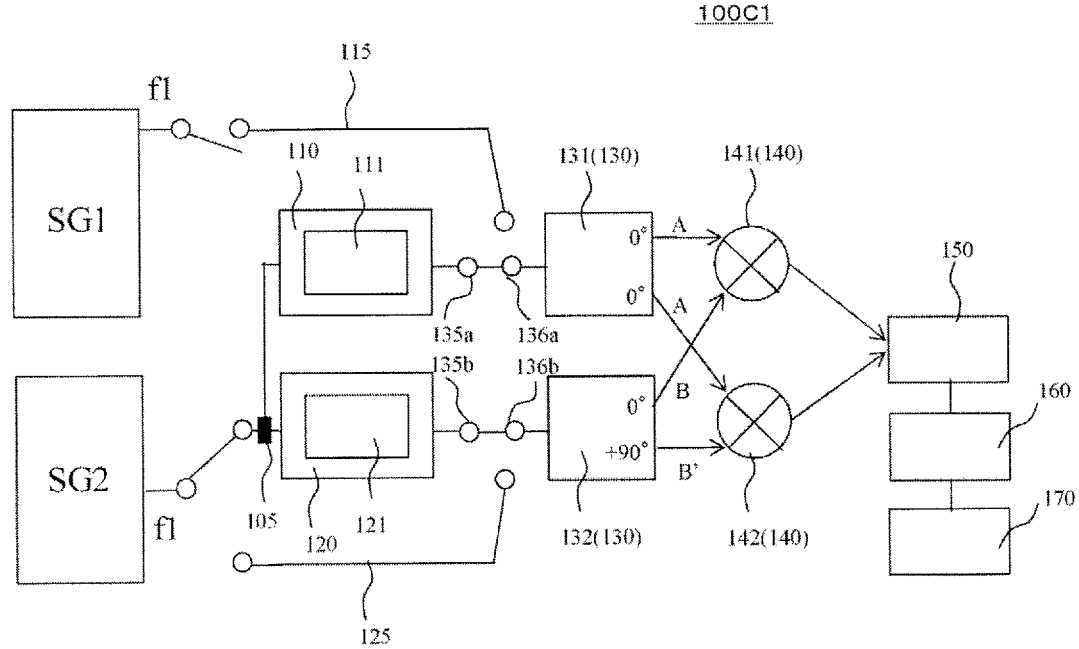

For example, as illustrated in FIG. 10(a), a modified example of the sensor devices according to the above-described embodiments may be employed.

In the sensor devices 100A and 100B according to the above-described embodiments, description has been given of an example of directly using signal from the detection element 110 and the reference element 120. In contrast, as in a sensor device 100E1 illustrated in FIG. 10(a), low noise amplifiers 133 (a first low noise amplifier 133a and a second low noise amplifier 133b) may be respectively disposed between the detection element 110 and the first branch part 131, and between the reference element 120 and the second branch part 132. According to this, it is possible to obtain high detection accuracy even in the following case.

Typically, in a SAW sensor, if sensitivity is high, variation of amplitude characteristics also increases. According to this, in a design in which sensitivity increases through adjustment of a thickness of the protective film 4 and the like, a loss also increases, and thus there is a concern that accurate measurement cannot be performed. However, when the low noise amplifiers 133 are interposed as described above, a signal is amplified, and thus it is possible to obtain high detection accuracy. On the other hand, in a case where a signal inputted to the calculation part 140 is small, a noise increases. Accordingly, there is a concern that the detection accuracy is lowered. However, when the low noise amplifiers 133 are interposed in an input path to the calculation part 140, a signal is amplified, and thus it is possible to obtain high detection accuracy. It is preferable that the low noise amplifiers 133 are provided on a side close to the elements 110 and 120 in the input path to the calculation part 140.

In addition, when enlarging a signal which is inputted to each of the detection element 110 and the reference element 120, there is a concern that input signals of the detection element 110 and the reference element 120, or these input signals and another input signal may have an adverse effect to each other through cross-talk and the like. In contrast, as is the case with the sensor device 100E1, when the low noise amplifiers 133 are interposed in the output paths from the detection element 110 and the reference element 120, it is possible to obtain high detection accuracy by suppressing the above-described crosstalk without enlarging the input signals. In addition, when enlarging the signal which is inputted to each of the detection element 110 and the reference element 120, there is a concern that the input signals thereof, or these input signals and another signal may be leaked to an outer side as an electromagnetic wave. In contrast, as is the case with the sensor device 100E1, when the low noise amplifiers 133 are interposed in the output paths from the detection element 110 and the reference element 120, it is possible to obtain high detection accuracy by suppressing leakage of the above-described electromagnetic wave to an outer side without enlarging the input signals.

As illustrated in FIG. 10(b), a modified example with respect to the sensor devices according to the above-described embodiments may be employed.

In the sensor devices 100B to 100D according to the above-described embodiments, as illustrated in FIG. 2 to FIG. 4, in the second branch part 132, the third branch signal is set to have the same phase as that of the first branch signal, and the fourth branch signal is set to have a phase which deviates from the phase of the first branch signal by 90°. Setting of the phase of the first to fourth branch signals is not limited thereto, and setting may be performed in order for a first detection voltage and a second voltage to have a phase difference except for ±180°. As in a sensor device 100E2 illustrated in FIG. 10(b), for example, the first branch signal and the second branch signal may be set to have the same phase, the third branch signal is set to have a phase which deviates from the phase of the first branch signal by −45°, and the fourth branch signal may be set to have a phase which deviates from the phase of first branch signal by +45°. Even in this case, it is possible to exhibit the same effect as in the sensor devices 100B to 100D according to the above-described embodiments.

In addition, as illustrated in FIG. 10(c), a modified example with respect to the sensor devices according to the above-described embodiments may be employed.

In the sensor devices 100B to 100D according to the above-described embodiments, as illustrated in FIG. 2 to FIG. 4, the first branch part 131 and the second branch part 132 are configured to branch a signal into two signals. Instead, the first branch part 131 and the second branch part 132 may be set to branch a signal into three or greater signals. As in a sensor device 100E3 illustrated in FIG. 10(c), for example, in a case where the first branch part 131 and the second branch part 132 branch a signal into three signals A, and three signals B, B', and B", respectively, three detection voltages having phase differences different from each other are obtained by using two signals among the obtained signals in accordance with the heterodyne system. According to this, it is possible to exhibit the same effect as in the sensor devices. In addition, in this case, in a case where a region with a small inclination is wide in each of the three detection voltages, in other words, even in a case where a region capable of measuring a detection voltage with satisfactory sensitivity is narrow, setting can be made to select a detection voltage having a region with high sensitivity from the three detection voltages, and thus it is possible to more effectively suppress a decrease in sensitivity.

In addition, it is not needless to say that the sensor devices 100 according to the above-described embodiment can be configured as a different type of sensor device through an appropriate combination of configurations thereof in a range of the technical idea of the invention. For example, a configuration of the sensor device 100A of the first embodiment, and a different configuration of the sensor device 100B of the second embodiment may be combined with each other.

REFERENCE SIGNS LIST

1: Piezoelectric substrate
2: Plate-like body

3: Cover
4: Protective film
5a: First detection IDT electrode
5b: First reference IDT electrode
6a: Second detection IDT electrode
6b: Second reference IDT electrode
7a, 7b: Metallic film
8: Wire
9: Pad
11a, 11b: First vibration space
12a, 12b: Second vibration space
20: Space
31: Reference potential line
100, 100A, 100B, 100C, 100D, 100E1, 100E2, 100E3: Sensor device
105: Element branch part
110: Detection element
111: Detection part
115: First connection wire
120: Reference element
121: Reference part
125: Second connection wire
130: Branch part
131: First branch part
132: Second branch part
133: Low noise amplifier
135a, 135b, 135c, 135d: Element side switch
136a, 136b: Branch part side switch
140: Calculation part
141: First calculation part
142: Second calculation part
150: Measurement part
160: Selection part
170: Detection amount calculating part
SG: Signal generator
SG1: First signal generator
SG2: Second signal generator
f1: Signal of first frequency
f2: Signal of second frequency
A, B, B', B": First to sixth branch signal

The invention claimed is:

1. A sensor device, comprising:
a first signal generator configured to generate at least one of a signal of a first frequency and a signal of a second frequency different from the first frequency;
a second signal generator configured to generate at least one of the signal of the first frequency and the signal of the second frequency; and
a calculation part configurable to be electrically coupled to each of the first signal generator and the second signal generator,
wherein the calculation part is configured to obtain a reference phase difference based on a first reference signal which is obtained by generating the first frequency signal from the first signal generator when the calculation part is electrically coupled to the first signal generator, and a second reference signal which is obtained by generating the second frequency signal from the second signal generator when the calculation part is electrically coupled to the second signal generator, wherein the reference phase difference is equal to a difference between the first frequency signal outputted from the first signal generator and the second frequency signal outputted from the second signal generator, and
wherein the calculation part is further configured to calculate a reference voltage corresponding to the reference phase difference, wherein the reference voltage is obtained by electrically converting the reference phase difference into a voltage,
wherein the first signal generator is configured to generate a signal of a third frequency which is different from the first frequency and the second frequency,
the second signal generator is configured to generate a signal of the third frequency, and
the calculation part calculates a detection voltage based on
a first detection signal which is obtained by generating the third frequency signal from the first signal generator when the first signal generator, the detection element and the calculation part are electrically coupled to each other, and
a first reference signal which is obtained by generating the third frequency signal from the second signal generator when the second signal generator, the reference element and the calculation part are electrically coupled to each other.

2. The sensor device according to claim 1,
wherein the calculation part is configured to calculate the reference voltage based on the first reference signal and the second reference signal in accordance with a heterodyne system.

3. The sensor device according to claim 1, further comprising:
a detection element configurable to be electrically coupled to the first signal generator and the calculation part, the detection element comprising a detection part configured to detect an analyte;
a reference element configurable to be electrically coupled to the second signal generator and the calculation part, the reference element comprising a reference part;
a first connection wire configurable to be electrically coupled to the first signal generator and the calculation part; and
a second connection wire configurable to be electrically coupled to the second signal generator and the calculation part,
wherein
the first signal generator is selectively electrically coupled to one of the first connection wire and the detection element, and
the second signal generator is selectively electrically coupled to one of the second connection wire and the reference element.

4. The sensor device according to claim 3,
wherein the calculation part calculates a detection voltage based on
a first detection signal which is obtained by generating the first frequency signal from the first signal generator when the first signal generator, the detection element and the calculation part are electrically coupled to each other, and
a first reference signal which is obtained by generating the signal of the first frequency from the second signal generator when the second signal generator, the reference element and the calculation part are electrically coupled to each other.

5. The sensor device according to claim 3,
further comprising an element branch part configurable to be electrically coupled to the detection element and the reference element,
wherein when one signal generator of the first signal generator and the second signal generator, the element branch part, and the calculation part are electrically coupled to each other, the calculation part calculates a detection voltage from a first detection signal and a first reference signal which are obtained by branching a signal, which is generated from the one signal generator, at the element branch part.

6. A sensor device, comprising:
a first signal generator configured to generate at least one of a signal of a first frequency and a signal of a second frequency different from the first frequency;
a second signal generator configured to generate at least one of the signal of the first frequency and the signal of the second frequency;
a calculation part configurable to be electrically coupled to each of the first signal generator and the second signal generator,
wherein the calculation part is configured to obtain a reference phase difference based on a first reference signal which is obtained by generating the first frequency signal from the first signal generator when the calculation part is electrically coupled to the first signal generator, and a second reference signal which is obtained by generating the second frequency signal from the second signal generator when the calculation part is electrically coupled to the second signal generator, wherein the reference phase difference is equal to a difference between the first frequency signal outputted from the first signal generator and the second frequency signal outputted from the second signal generator, and
wherein the calculation part is further configured to calculate a reference voltage corresponding to the reference phase difference, wherein the reference voltage is obtained by electrically converting the reference phase difference into a voltage; and
a measurement part electrically coupled to the calculation part, wherein the measurement part is configured to select a detection phase difference which is one among a plurality of phase candidate values corresponding to the detection voltage obtained with reference to the reference voltage.

7. The sensor device according to claim 6,
wherein the calculation part calculates the detection voltage based on the first detection signal and the first reference signal in accordance with a heterodyne system.

8. A sensor device, comprising:
a first signal generator configured to generate at least one of a signal of a first frequency and a signal of a second frequency different from the first frequency;
a second signal generator configured to generate at least one of the signal of the first frequency and the signal of the second frequency;
a first branch part configurable to be electrically coupled to the first signal generator, the first branch part configured to branch a first reference signal which is obtained from the first signal generator, into a first branch signal and a second branch signal;
a second branch part configurable to be electrically coupled to the second signal generator, the second branch part configured to branch a second reference signal which is obtained from the second signal generator, into a third branch signal and a fourth branch signal;

a first calculation part configured to
obtain a first reference phase difference based on
the first branch signal from the first reference signal obtained by generating the first frequency signal from the first signal generator when the first calculation part is electrically coupled to the first signal generator and the first branch part, and
the third branch signal from the second reference signal obtained by generating the second frequency signal from the second signal generator when the first calculation part is electrically coupled to the second signal generator and the second branch part, and
calculate a first reference voltage corresponding to the first reference phase difference; and
a second calculation part configured to
obtain a second reference phase difference based on
the second branch signal from the first reference signal obtained by generating the first frequency signal from the first signal generator when the second calculation part is electrically coupled to the first signal generator and the first branch part, and
the fourth branch signal from the second reference signal obtained by generating the second frequency signal from the second signal generator when the second calculation part is electrically coupled to the second signal generator and the second branch part, and
calculate a second reference voltage corresponding to the second reference phase difference.

9. The sensor device according to claim 8,
wherein the first calculation part is configured to calculate the first reference voltage based on the first branch signal and the third branch signal in accordance with a heterodyne system, and
the second calculation part is configured to calculate the second reference voltage based on the second branch signal and the fourth branch signal in accordance with the heterodyne system.

10. The sensor device according to claim 9,
further comprising:
a detection element configurable to be electrically coupled to the first signal generator and the first branch part, the detection element comprising a detection part configured to detect an analyte;
a reference element configurable to be electrically coupled to the second signal generator and the second branch part, the reference element comprising a reference part;
a first connection wire configurable to be electrically coupled to the first signal generator and the first branch part; and
a second connection wire configurable to be electrically coupled to the second signal generator and the second branch part,
wherein
the first signal generator is selectively electrically coupled to one of the first connection wire and the detection element, and
the second signal generator is selectively-electrically coupled to one of the second connection wire and the reference element.

11. The sensor device according to claim 10,
wherein the first branch part is further configurable to be electrically coupled to the detection element, and branches a detection signal which is obtained from the detection element, into the first branch signal and the second branch signal, the second branch part is further configurable to be electrically coupled to the reference element, and branches a reference signal which is obtained from the reference element, into the third branch signal and the fourth branch signal, the first calculation part calculates a first detection voltage based on the first branch signal from a first branch detection signal obtained by generating the signal of the first frequency from the first signal generator when the first signal generator, the detection element, the first branch part, and the first calculation part are electrically coupled to each other, and the third branch signal from a first branch reference signal obtained by generating the signal of the first frequency from the second signal generator when the second signal generator, the reference element, the second branch part, and the second calculation part are electrically coupled to each other, and the second calculation part calculates a second detection voltage based on the second branch signal from a second branch detection signal obtained by generating the signal of the first frequency from the first signal generator when the first signal generator, the detection element, the first branch part, and the first calculation part are electrically coupled to each other, and the fourth branch signal from a second branch reference signal obtained by generating the signal of the first frequency from the second signal generator when the second signal generator, the reference element, the second branch part, and the second calculation part are electrically coupled to each other.

12. The sensor device according to claim 11, further comprising a measurement part electrically coupled to the first calculation part and the second calculation part, wherein the measurement part is electrically coupled to the first calculation part and the second calculation part, and selects a detection phase difference which is one phase candidate value among a plurality of first phase candidate values corresponding to the first detection voltage obtained with reference to the first reference voltage, and a plurality of second phase candidate values corresponding to the second detection voltage obtained with reference to the second reference voltage.

13. The sensor device according to claim 10, wherein the detection element comprises a first detection element and a second detection element.

14. The sensor device according to claim 13, wherein the first signal generator is electrically coupled to one of the first detection element and the second detection element.

15. The sensor device according to claim 13, wherein the first signal generator is electrically coupled to one of the first detection element, the second detection element, and the first connection wire.

16. The sensor device according to claim 10, wherein the reference element comprises a first reference element and a second reference element.

17. The sensor device according to claim 11, wherein the first calculation part calculates the first detection voltage based on the first branch signal and the third branch signal in accordance with a heterodyne system, and the second calculation part calculates the second detection voltage based on the second branch signal and the fourth branch signal in accordance with the heterodyne system.

* * * * *